(12) United States Patent
Kwan et al.

(10) Patent No.: US 12,231,342 B1
(45) Date of Patent: Feb. 18, 2025

(54) QUEUE PACING IN A NETWORK DEVICE

(71) Applicant: Marvell Asia Pte Ltd, Singapore (SG)

(72) Inventors: Bruce Kwan, Sunnyvale, CA (US); William Brad Matthews, Los Gatos, CA (US)

(73) Assignee: Marvel Asia Pte Ltd, Singapore (SG)

( * ) Notice: Subject to any disclaimer, the term of this patent is extended or adjusted under 35 U.S.C. 154(b) by 166 days.

(21) Appl. No.: 18/117,290

(22) Filed: Mar. 3, 2023

(51) Int. Cl.
| | |
|---|---|
| H04L 47/25 | (2022.01) |
| H04L 47/11 | (2022.01) |
| H04L 47/62 | (2022.01) |
| H04L 49/9005 | (2022.01) |

(52) U.S. Cl.
CPC .............. *H04L 47/25* (2013.01); *H04L 47/11* (2013.01); *H04L 47/622* (2013.01); *H04L 49/9005* (2013.01)

(58) Field of Classification Search
CPC ..... H04L 47/25; H04L 49/9005; H04L 47/11; H04L 47/622; H04L 47/62
See application file for complete search history.

(56) References Cited

U.S. PATENT DOCUMENTS

| | | | |
|---|---|---|---|
| 5,905,870 A | 5/1999 | Mangin | |
| 6,035,333 A | 3/2000 | Jeffries | |
| 6,957,269 B2 | 10/2005 | Williams | |
| 7,061,868 B1 | 6/2006 | Ahlfors | |
| 8,018,851 B1 | 9/2011 | Medina | |
| 8,520,517 B2 | 8/2013 | Kwan et al. | |
| 8,711,697 B1 | 4/2014 | Orr et al. | |
| 9,438,527 B2 | 9/2016 | Shamis et al. | |
| 9,705,808 B2 | 7/2017 | Arumilli | |
| 10,505,851 B1 | 12/2019 | Matthews et al. | |
| 10,749,803 B1 | 8/2020 | Leib | |
| 10,917,349 B2 | 2/2021 | Leib | |
| 2003/0161303 A1 | 8/2003 | Mehrvar et al. | |
| 2004/0088451 A1 | 5/2004 | Han | |
| 2005/0195845 A1 | 9/2005 | Mayhew | |
| 2005/0270974 A1 | 12/2005 | Mayhew | |
| 2006/0056308 A1 | 3/2006 | Gusat | |
| 2007/0047535 A1 | 3/2007 | Varma | |
| 2007/0140282 A1 | 6/2007 | Lakshmanamurthy | |
| 2007/0153697 A1 | 7/2007 | Kwan et al. | |
| 2008/0186862 A1 | 8/2008 | Corbett et al. | |
| 2008/0298248 A1 | 12/2008 | Roeck et al. | |
| 2009/0003209 A1 | 1/2009 | Kalkunte et al. | |
| 2009/0003212 A1 | 1/2009 | Kwan | |

(Continued)

*Primary Examiner* — Tonia L Dollinger
*Assistant Examiner* — Mehulkumar J Shah

(57) ABSTRACT

A network device includes ingress queues for storing data units while the data units are being processed by ingress packet processors, and a plurality of egress buffer memories for storing data units received from the ingress queues while the data units are being processed by the egress packet processors. First circuitry controls respective rates at which data units are transferred from ingress queues to egress buffer memories. Second circuitry monitors the egress buffer memories for congestion and sends, to the first circuitry, flow control messages related to congestion resulting of egress buffer memories. The first circuitry progressively increases over time a rate at which data from each ingress queue are transferred to an egress buffer memory in response to receiving a flow control message that indicates that congestion corresponding to the egress buffer memory has ended.

20 Claims, 7 Drawing Sheets

(56) References Cited

U.S. PATENT DOCUMENTS

| | | | |
|---|---|---|---|
| 2009/0268612 A1 | 10/2009 | Felderman et al. | |
| 2009/0323526 A1 | 12/2009 | Pike et al. | |
| 2011/0044168 A1 | 2/2011 | Nadas | |
| 2011/0128853 A1 | 6/2011 | Nishimura | |
| 2011/0185068 A1 | 7/2011 | Schmieder et al. | |
| 2012/0163176 A1 | 6/2012 | Matsuoka | |
| 2012/0224480 A1 | 9/2012 | Nakash | |
| 2012/0250511 A1 | 10/2012 | Neeser | |
| 2012/0263185 A1 | 10/2012 | Bejerano | |
| 2013/0060898 A1 | 3/2013 | Tanaka et al. | |
| 2013/0250762 A1 | 9/2013 | Assarpour | |
| 2014/0022895 A1 | 1/2014 | Matthews et al. | |
| 2014/0177442 A1 | 6/2014 | Tanaka | |
| 2014/0241160 A1 | 8/2014 | Kwan | |
| 2015/0103667 A1 | 4/2015 | Elias | |
| 2016/0248675 A1 | 8/2016 | Zheng | |
| 2016/0308775 A1 | 10/2016 | Kojima | |
| 2017/0039075 A1 | 2/2017 | Li et al. | |
| 2017/0339062 A1 | 11/2017 | Mayer-Wolf | |
| 2018/0069795 A1 | 3/2018 | Shen | |
| 2018/0176136 A1 | 6/2018 | Yang et al. | |
| 2018/0262787 A1 | 9/2018 | Lu et al. | |
| 2019/0182161 A1 | 6/2019 | Ravi | |
| 2022/0014473 A1* | 1/2022 | Matthews | H04L 47/11 |
| 2022/0078119 A1* | 3/2022 | Goyal | H04L 47/25 |
| 2022/0377026 A1* | 11/2022 | Chachmon | H04L 47/62 |

* cited by examiner

QUEUE PACING IN A NETWORK DEVICE

FIELD OF TECHNOLOGY

The present disclosure relates generally to communication networks, and more particularly to buffering data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, a switch, a bridge, a router, a server, a gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a Transmission Control Protocol (TCP) segment or a User Datagram Protocol (UDP) datagram. The Open Systems Interconnection (OSI) model of communications describes these and other layers of communications. However, other models defining other ways of layering information may also be used. The Internet Protocol (IP) suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, a virtual local area network (VLAN) identifier, path information, etc., is typically used to determine how to handle a data unit (i.e., what actions to take with respect to the data unit). For instance, an IP data packet may include a destination IP address field within the header of the IP data packet, based upon which a network router may determine one or more other networking devices, among a number of possible other networking devices, to which the IP data packet is to be forwarded.

In these and other contexts, a network device or other computing device often needs to temporarily store data in one or more memories or other storage media until resources become available to process the data. The storage media in which such data is temporarily stored is often logically and/or physically divided into discrete regions or sections referred to as data buffers (or, simply, "buffers"). The rules and logic utilized to determine which data is stored in what buffer is a significant system design concern having a variety of technical ramifications, including without limitation the amount of storage media needed to implement buffers, the speed of that media, how that media is interconnected with other system components, and/or the manner in the buffered data is queued and processed.

SUMMARY

In an embodiment, a network device comprises: a plurality of network interfaces; a plurality of ingress packet processors configured to process data units received via the plurality of network interfaces to determine network interfaces, among the plurality of network interfaces, that are to transmit the data units; a plurality of ingress queues configured to store data units received via the plurality of network interfaces while the data units are being processed by the plurality of ingress packet processors; a plurality of egress packet processors configured to process data units received from the plurality of ingress queues; a plurality of egress buffer memories configured to store data units received from the plurality of ingress queues while the data units are being processed by the plurality of egress packet processors, the data units received from the plurality of ingress queues being stored in a plurality of egress queues corresponding to the plurality of egress buffer memories; first circuitry configured to control respective rates at which data units are transferred from at least some ingress queues to at least some egress buffer memories; and second circuitry configured to monitor the plurality of egress buffer memories for congestion and to send, to the first circuitry, flow control messages related to congestion resulting from data units transferred to egress buffer memories among the plurality of egress buffer memories from ingress queues among the plurality of ingress queues; wherein the first circuitry is further configured to, for each of at least some ingress queues among the plurality of ingress queues, progressively increase over time a rate at which data from the each ingress queue are transferred to an egress buffer memory in response to receiving a flow control message that indicates that congestion corresponding to the egress buffer memory has ended, including progressively increasing the rate over time from zero to a maximum transfer rate.

In another embodiment, a method for processing data units in a network device includes: receiving data units at a plurality of network interfaces of the network device; storing data units received at the plurality of network interfaces in a plurality of ingress queues of the network device while the data units are processed by a plurality of ingress packet processors of the network device; transferring data units from the plurality of ingress queues to a plurality of egress buffer memories of the network device; storing data units transferred from the plurality of ingress queues in a plurality of egress queues while the data units are processed by a plurality of egress processors of the network device, the plurality of egress queues corresponding to the plurality of egress buffer memories; monitoring, by the network device, the plurality of egress buffer memories to detect congestion corresponding to data units transferred from the plurality of ingress queues; for each of at least some ingress queues, pausing transfer of data units to one or more egress buffer memories in response to determining congestion corresponding to data units transferred from the each ingress queue; and for each of at least some ingress queues, progressively increasing over time a rate at which data from the each ingress queue are transferred to one or more egress buffer memories in response to determining that the congestion has ended.

DETAILED DESCRIPTION

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Approaches, techniques, and mechanisms are disclosed for more optimally transferring data within a network device, such as within a switch or router. These approaches, techniques, and mechanisms are sometimes referred to herein as "progressive queue pacing."

Incoming data units, such as packets, frames, cells, etc., are temporarily stored in one or more ingress buffers while the data units are processed by an ingress processor of the network device, e.g., to determine one or more network interfaces via which the data units are to be transmitted by the network device (sometimes referred to herein as "target network interfaces"), according to some embodiments. Then, the data units are transferred to one or more egress buffers associated with the target network interfaces and temporarily stored until the data units can be transmitted via the target network interfaces, according to some embodiments.

First circuitry associated with the ingress buffers controls respective rates at which data units are transferred from ingress buffers, according to some embodiments. Second circuitry associated with the egress buffers monitors the egress buffers for congestion and sends to the first circuitry flow control messages indicative of congestion of egress buffers, according to some embodiments. For each of at least some ingress buffers, the first circuitry progressively increases over time a rate at which data units are transferred from the ingress buffer in response to receiving a flow control message that indicates data from the ingress buffer can resume transfer.

In some embodiments that utilize the first circuitry and second circuitry described above, bursting of traffic to egress buffers is reduced, which enables the sizes of the egress buffers to be reduced.

Figure 1:
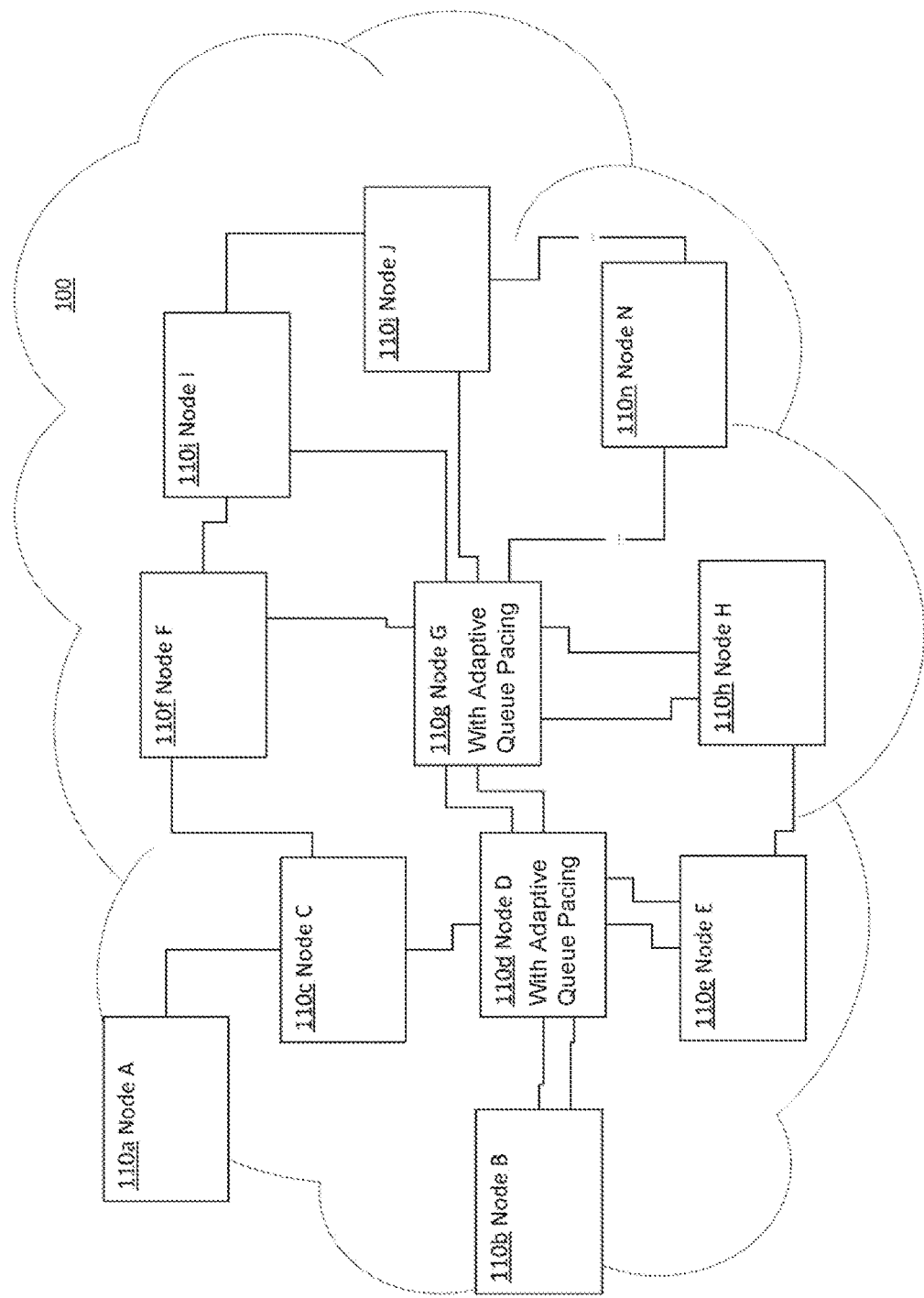
FIG. 1 is a simplified diagram of an example networking system in which progressive queue pacing techniques described herein are practiced, according to an embodiment.

FIG. 1 is a simplified diagram of an example networking system 100, also referred to as a network, in which the techniques described herein are practiced, according to an embodiment. Networking system 100 comprises a plurality of interconnected nodes 110 *a*-110 *n* (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing machine-readable instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

While each node 110 may or may not have a variety of other functions, in an embodiment, each node 110 is configured to send, receive, and/or relay data to one or more other nodes 110 via communication links. In general, data is communicated as a series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g., a TCP segment) to a second node 110 over a path that includes an intermediate node 110. The data unit may be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g., packets or frames) and route those subunits to the second node 110 without ever composing the entire original data unit.

When a node 110 receives a data unit, it typically examines addressing information within the data unit (and/or other information within the data unit) to determine how to process the data unit. The addressing information may include, for instance, a media access control (MAC) address, an IP address, a VLAN identifier, information within a multi-protocol label switching (MPLS) label, or any other suitable information. If the addressing information indicates that the receiving node 110 is not the destination for the data unit, the node may look up forwarding information within a forwarding database of the receiving node 110 and forward the data unit to one or more other nodes 110 connected to the receiving node 110 based on the forwarding information. The forwarding information may indicate, for instance, an outgoing port over which to send the data unit, a header to attach to the data unit, a new destination address to overwrite in the data unit, etc. In cases where multiple paths to the destination node 110 are possible, the forwarding information may include information indicating a suitable approach for selecting one of those paths, or a path deemed to be the best path may already be defined.

Addressing information, flags, labels, and other metadata used for determining how to handle a data unit are typically embedded within a portion of the data unit known as the header. One or more headers are typically at the beginning of the data unit, and are followed by the payload of the data unit. For example, a first data unit having a first header corresponding to a first communication protocol may be encapsulated in a second data unit at least by appending a second header to the first data unit, the second header corresponding to a second communication protocol. For example, the second communication protocol is below the first communication protocol in a protocol stack, in some embodiments.

A header has a structure defined by a communication protocol and comprises fields of different types, such as a destination address field, a source address field, a destination port field, a source port field, and so forth, according to some embodiments. In some protocols, the number and the arrangement of fields is fixed. Other protocols allow for variable numbers of fields and/or variable length fields with some or all of the fields being preceded by type information that indicates to a node the meaning of the field and/or length information that indicates a length of the field. In some embodiments, a communication protocol defines a header having multiple different formats and one or more values of one or more respective fields in the header indicate to a node the format of the header. For example, a header includes a type field, a version field, etc., that indicates to which one of multiple formats that header conforms.

Different communication protocols typically define respective headers having respective formats.

For convenience, data units are sometimes referred to herein as "packets," which is a term often used to refer to data units defined by the IP. The approaches, techniques, and mechanisms described herein, however, are applicable to data units defined by suitable communication protocols other than the IP. Thus, unless otherwise stated or apparent, the term "packet" as used herein should be understood to refer to any type of data structure communicated across a network, including packets as well as segments, cells, data frames, datagrams, and so forth.

Any node in the depicted network 100 may communicate with any other node in the network 100 by sending packets through a series of nodes 110 and links, referred to as a path. For example, Node B (110 *b*) may send packets to Node H (110 *h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g., via which one or more egress ports should send the packet be transmitted). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110, according to some embodiments. In this manner, the actual path of a packet is product of each node 110 along the path making routing decisions about how best to move the packet along to the destination node 110 identified by the packet, according to some embodiments.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

One or more of the nodes 110 utilize progressive queue pacing techniques, examples of which are described below. For example, FIG. 1 depicts node 110*d* and node 110*g* as utilizing progressive queue pacing techniques.

Figure 2:
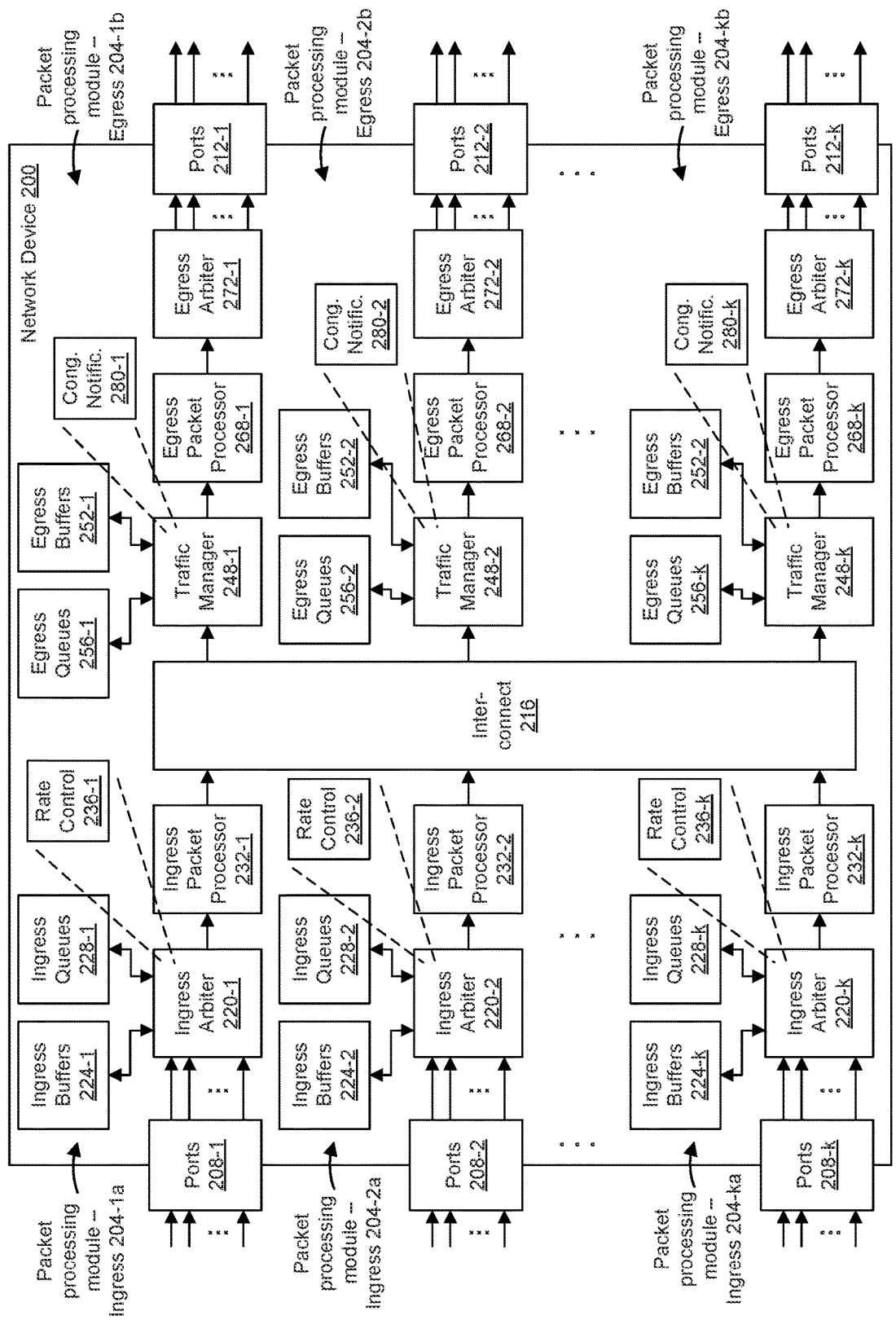
FIG. 2 is a simplified diagram of an example network device in which progressive queue pacing techniques are utilized, according to an embodiment.

FIG. 2 is a simplified diagram of an example network device 200 in which progressive queue pacing techniques are utilized, according to an embodiment. The network device 200 is a computing device comprising any combination of i) hardware and/or ii) one or more processors executing machine-readable instructions, being configured to implement the various logical components described herein.

In some embodiments, the node 110d and node 110g of FIG. 1 have a structure the same as or similar to the network device 200. In another embodiment, the network device 200 may be one of a number of components within a node 110. For instance, network device 200 may be implemented on one or more integrated circuits, or "chips," configured to perform switching and/or routing functions within a node 110, such as a network switch, a router, etc. The node 110 may further comprise one or more other components, such as one or more central processor units, storage units, memories, physical interfaces, LED displays, or other components external to the one or more chips, some or all of which may communicate with the one or more chips. In some such embodiments, the node 110 comprises multiple network devices 200.

In other embodiments, the network device 200 is utilized in a suitable networking system different than the example networking system 100 of FIG. 1.

The network device 200 includes a plurality of packet processing modules 204, with each packet processing module being associated with a respective plurality of ingress network interfaces 208 (sometimes referred to herein as "ingress ports" for purposes of brevity) and a respective plurality of egress network interfaces 212 (sometimes referred to herein as "egress ports" for purposes of brevity). The ingress ports 208 are ports by which packets are received via communication links in a communication network, and the egress ports 212 are ports by which at least some of the packets are transmitted via the communication links after having been processed by the network device 200.

Although the term "packet" is sometimes used herein to describe the data units processed by the network device 200, the data units may be packets, cells, frames, or other suitable structures. For example, in some embodiments the individual atomic data units upon which the depicted components operate are cells or frames. That is, data units are received, acted upon, and transmitted at the cell or frame level, in some such embodiments. These cells or frames are logically linked together as the packets to which they respectively belong for purposes of determining how to handle the cells or frames, in some embodiments. However, the cells or frames are not actually assembled into packets within device 200, particularly if the cells or frames are being forwarded to another destination through device 200, in some embodiments.

Ingress ports 208 and egress ports 212 are depicted as separate ports for illustrative purposes, but typically correspond to the same physical network interfaces of the network device 200. That is, a single network interface acts as both an ingress port 208 and an egress port 212, in some embodiments. Nonetheless, for various functional purposes, certain logic of the network device 200 may view a single physical network interface as logically being a separate ingress port 208 and egress port 212. Moreover, for various functional purposes, certain logic of the network device 200 may subdivide a single physical network interface into multiple ingress ports 208 or egress ports 212 (e.g., "virtual ports"), or aggregate multiple physical network interfaces into a single ingress port 208 or egress port 212 (e.g., a trunk, a link aggregate group (LAG), an equal cost multipath (ECMP) group, etc.). Hence, in various embodiments, ingress ports 208 and egress ports 212 are considered distinct logical constructs that are mapped to physical network interfaces rather than simply as distinct physical constructs.

In some embodiments, at least some ports 208/212 are coupled to one or more transceivers (not shown in FIG. 2), such as Serializer/Deserializer ("SerDes") blocks. For instance, ingress ports 208 provide serial inputs of received data units into a SerDes block, which then outputs the data units in parallel into a packet processing module 204. On the other end, a packet processing module 204 provides data units in parallel into another SerDes block, which outputs the data units serially to egress ports 212. There may be any number of input and output SerDes blocks, of any suitable size, depending on the specific implementation (e.g., four groups of 4×25 gigabit blocks, eight groups of 4×100 gigabit blocks, etc.).

Each packet processing module 204 comprises an ingress portion 204-xa and an egress portion 204-xb. The ingress portion 204-xa generally performs ingress processing operations for packets such as one of, or any suitable combination of two or more of: packet classification, tunnel termination, Layer-2 (L2) forwarding lookups, Layer-3 (L3) forwarding lookups, etc.

The egress portion 204-xb generally performs egress processing operations for packets such as one of, or any suitable combination of two or more of: packet duplication (e.g., for multicast packets), header alteration, rate limiting, traffic shaping, egress policing, flow control, maintaining statistics regarding packets, etc.

Each ingress portion 204-xa is communicatively coupled to multiple egress portions 204-xb via an interconnect 216. Similarly, each egress portion 204-xb is communicatively coupled to multiple ingress portions 204-xa via the interconnect 216. The interconnect 216 comprises one or more switching fabrics, one or more crossbars, etc., according to various embodiments.

In operation, an ingress portion 204-xa receives a packet via an associated ingress port 208 and performs ingress processing operations for the packet, including determining one or more egress ports 212 via which the packet is to be transmitted (sometimes referred to herein as "target ports"). The ingress portion 204-xa then transfers the packet, via the interconnect 216, to one or more egress portion 204-xb corresponding to the determined one or more target ports 212. Each egress portion 204-xb that receives the packet performs egress processing operations for the packet and then transfers the packet to one or more determined target ports 212 associated with the egress portion 204-xb for transmission from the network device 200.

In some embodiments, the ingress portion 204-xa determines a virtual target port and one or more egress portions 204-xb corresponding to the virtual target port map the virtual target portion to one or more physical egress ports 212. In some embodiments, the ingress portion 204-xa determines a group of target ports 212 (e.g., a trunk, a LAG, an ECMP group, etc.) and one or more egress portions 204-xb corresponding to the group of target ports selects one or more particular target egress ports 212 within the group of target ports. In the present disclosure, the term "target port" refers to a physical port, a virtual port, a group of target ports, etc., unless otherwise stated or apparent.

Each packet processing module 204 is implemented using any suitable combination of fixed circuitry and/or a processor executing machine-readable instructions, such as specific logic components implemented by one or more FPGAs, ASICs, or one or more processors executing machine-readable instructions, according to various embodiments.

In some embodiments, at least respective portions of multiple packet processing modules 204 are implemented on a single IC (or "chip"). In some embodiments, respective portions of multiple packet processing modules 204 are implemented on different respective chips.

In an embodiment, at least some components of each ingress portion 204-*xa* are arranged in a pipeline such that outputs of one or more components are provided as inputs to one or more other components. In some embodiments in which the components are arranged in a pipeline, one or more components of the ingress portion 204-*xa* are skipped or bypassed for certain packets. In other embodiments, the components are arranged in a suitable manner that is not a pipeline. The exact set and/or sequence of components that process a given packet may vary, in some embodiments, depending on the attributes of the packet and/or the state of the network device 200, in some embodiments.

Similarly, in an embodiment, at least some components of each egress portion 204-*xb* are arranged in a pipeline such that outputs of one or more components are provided as inputs to one or more other components. In some embodiments in which the components are arranged in a pipeline, one or more components of the egress portion 204-*xb* are skipped or bypassed for certain packets. In other embodiments, the components are arranged in a suitable manner that is not a pipeline. The exact set and/or sequence of components that process a given packet may vary, in some embodiments, depending on the attributes of the packet and/or the state of the network device 200, in some embodiments.

Each ingress portion 204-*xa* includes circuitry 220 (sometimes referred to herein as "arbitration circuitry") that is configured to reduce traffic loss during periods of bursty traffic and/or other congestion. In some embodiments, the arbitration circuitry 220 is configured to function in a manner that facilitates economization of the sizes, numbers, and/or qualities of downstream components within the packet processing module 204 by more intelligently controlling the release of data units to these components. In some embodiments, the arbitration circuitry 220 is further configured to support features such as lossless protocols and cut-through switching while still permitting high rate bursts from ports 208.

The arbitration circuitry 220 is coupled to an ingress buffer memory 224 that is configured to temporarily store packets that are received via the ports 208 while components of the packet processing module 204 process the packets.

Each data unit received by the ingress portion 204-*xa* is stored in one or more entries within one or more buffers, which entries are marked as utilized to prevent newly received data units from overwriting data units that are already buffered in the buffer memory 224. After a data unit is released to an egress portion 204-*xb*, the one or more entries in which a data unit is buffered in the ingress buffer memory 224 are then marked as available for storing newly received data units, in some embodiments.

Each buffer may be a portion of any suitable type of memory, including volatile memory and/or non-volatile memory. In an embodiment, the ingress buffer memory 224 comprises a single-ported memory that supports only a single input/output (I/O) operation per clock cycle (i.e., either a single read operation or a single write operation). Single-ported memories are utilized for higher operating frequency, though in other embodiments multi-ported memories are used instead. In an embodiment, the ingress buffer memory 224 comprises multiple physical memories that are capable of being accessed concurrently in a same clock cycle, though full realization of this capability is not necessary. In an embodiment, each buffer is a distinct memory bank, or set of memory banks. In yet other embodiments, different buffers are different regions within a single memory bank. In an embodiment, each buffer comprises many addressable "slots" or "entries" (e.g., rows, columns, etc.) in which data units, or portions thereof, may be stored.

Generally, buffers in the ingress buffer memory 224 comprises a variety of buffers or sets of buffers, each utilized for varying purposes and/or components within the ingress portion 204-*xa*.

The ingress portion 204-*xa* comprises a buffer manager (not shown) that is configured to manage use of the ingress buffers 224. The buffer manager performs, for example, one of or any suitable combination of the following: allocates and deallocates specific segments of memory for buffers, creates and deletes buffers within that memory, identifies available buffer entries in which to store a data unit, maintains a mapping of buffers entries to data units stored in those buffers entries (e.g., by a packet sequence number assigned to each packet when the first the first data unit in that packet was received), marks a buffer entry as available when a data unit stored in that buffer is dropped, sent, or released from the buffer, determines when a data unit is to be dropped because it cannot be stored in a buffer, performs garbage collection on buffer entries for data units (or portions thereof) that are no longer needed, etc., in various embodiments.

The buffer manager includes buffer assignment logic (not shown) that is configured to identify which buffer, among multiple buffers in the ingress buffer memory 224, should be utilized to store a given data unit, or portion thereof, according to an embodiment. In some embodiments, each packet is stored in a single entry within its assigned buffer. In yet other embodiments, a packet is received as, or divided into, constituent data units such as fixed-size cells or frames, and the constituent data units are stored separately (e.g., not in the same location, or even the same buffer).

In some embodiments, the buffer assignment logic is configured to assign data units to buffers pseudorandomly, using a round-robin approach, etc. In some embodiments, the buffer assignment logic is configured to assign data units to buffers at least partially based on characteristics of those data units, such as corresponding traffic flows, destination addresses, source addresses, ingress ports, and/or other metadata. For example, different buffers or sets of buffers are utilized to store data units received from different ports 208/212 or sets of ports 208,212. In an embodiment, the buffer assignment logic also or instead utilizes buffer state information, such as utilization metrics, to determine to which buffer a data unit is to be assigned. Other assignment considerations include buffer assignment rules (e.g., no writing two consecutive constituent parts of a same packet to the same buffer) and I/O scheduling conflicts (e.g., to avoid assigning a data unit to a buffer when there are no available write operations to that buffer on account of other components currently reading content from the buffer).

The arbitration circuitry 220 is also configured to maintain ingress queues 228, according to some embodiments, which are used to manage the order in which data units are processed from the buffers in the ingress buffer memory 224. Each data unit, or the buffer locations(s) in which the data unit is stored, is said to belong to one or more constructs referred to as queues. Typically, a queue is a set of memory locations (e.g., in the ingress buffer memory 224) arranged in some order by metadata describing the queue. The memory locations may (and often are) non-contiguous relative to their addressing scheme and/or physical or logical arrangement.

In some embodiments, the sequence of constituent data units as arranged in a queue generally corresponds to an order in which the data units or data unit portions in the queue will be released and processed. Such queues are known as first-in-first-out ("FIFO") queues, though in other embodiments other types of queues may be utilized. In some embodiments, the number of data units or data unit portions assigned to a given queue at a given time may be limited, either globally or on a per-queue basis, and this limit may change over time.

The ingress portion 204-xa also includes an ingress packet processor 232 that is configured to perform ingress processing operations for packets such as one of, or any suitable combination of two or more of: packet classification, tunnel termination, L2 forwarding lookups, L3 forwarding lookups, etc., according to various embodiments. For example, the ingress packet processor 232 includes an L2 forwarding database and/or an L3 forwarding database, and the ingress packet processor 232 performs L2 forwarding lookups and/or L3 forwarding lookups to determine target ports for packets. In some embodiments, the ingress packet processor 232 uses header information in packets to perform L2 forwarding lookups and/or L3 forwarding lookups.

The ingress arbitration circuitry 220 is configured to release a certain number of data units (or portions of data units) from ingress queues 228 for processing (e.g., by the ingress packet processor 232) or for transfer (e.g., via the interconnect 216) each clock cycle or other defined period of time. The next data unit (or portion of a data unit) to release may be identified using one or more ingress queues 228. For instance, respective ingress ports 208 (or respective groups of ingress ports 208) are assigned to respective ingress queues 228, and the ingress arbitration circuitry 220 selects queues 228 from which to release one or more data units (or portions of data units) according to a selection scheme, such as a round-robin scheme or another suitable selection scheme, in some embodiments. Additionally, when ingress queues 228 are FIFO queues, the ingress arbitration circuitry 220 selects a data unit (or a portion of a data unit) from a head of a FIFO ingress queue 228, which corresponds to a data unit (or portion of a data unit) that has been in the FIFO ingress queue 228 for a longest time, in some embodiments.

In various embodiments, any of various suitable techniques are utilized to identify a particular ingress queues 228 from which to release a data unit (or a portion of a data unit) at a given time. For example, as discussed above, the ingress arbitration circuitry 220 retrieves data units (or portions of data units) from the multiple ingress queues 228 in a round-robin manner, in some embodiments. As other examples, the ingress arbitration circuitry 220 selects ingress queues 228 from which to retrieve data units (or portions of data units) using a pseudo-random approach, a probabilistic approach, etc., according to some embodiments.

In some embodiments, each of at least some ingress queues 228 is weighted by an advertised transmission rate of a corresponding ingress port 208. As an illustrative example, for every one data unit released from an ingress queue 228 corresponding to a 100 Mbps ingress port 208, ten data units are released from a queue corresponding to a 1 Gbps ingress port 228. The length and/or average age of an ingress queue 228 is also (or instead) utilized to prioritize queue selection. In another embodiment, a downstream component within the ingress portion 204-xa (or within an egress portion 204-xb) instructs the arbitration circuitry 220 to release data units corresponding to certain ingress queues 228. Hybrid approaches are used, in some examples. For example, one of the longest queues 228 is selected each odd clock cycle, whereas any of the ingress queues 228 is pseudorandomly selected every even clock cycle. In an embodiment, a token-based mechanism is utilized for releasing data units from ingress queues 228.

Yet other queue selection mechanisms are also possible. The techniques described herein are not specific to any one of these mechanisms, unless otherwise stated.

In some embodiments, ingress queues 228 correspond to specific groups of related traffic, also referred to as priority sets or classes of service. For instance, all packets carrying VoIP traffic are assigned to a first ingress queue 228, while all data units carrying Storage Area Network ("SAN") traffic are assigned to a different second ingress queue 228. As another example, each of these queues 228 are weighted differently, so as to prioritize certain types of traffic over other traffic, in some embodiments. Moreover, different ingress queues 228 correspond to specific combinations of ingress ports 208 and priority sets, in some embodiments. For example, a respective set of multiple queues 228 correspond to each of at least some of the ingress ports 208, with respective queues 228 in the set of multiple queues 228 corresponding to respective priority sets.

Generally, when the ingress portion 204-xa is finished processing packets, the packets are transferred to one or more egress portions 204-xb via the interconnect 216. Transferring a data unit from an ingress portion 204-xa to an egress portions 204-xb comprises releasing (or dequeuing) the data unit and transferring the data unit to the egress portion 204-xb via the interconnect 216, according to an embodiment.

The ingress arbitration circuitry 220 includes rate control circuitry 236 that is configured to control rates at which packets are transferred from the ingress queues 228 to the egress portions 204-xb. In some embodiments, controlling the rate at which packets are transferred from an ingress queue 228 to an egress portion 204-xb comprises controlling a rate at which data units (or portions of data units) are dequeued from an ingress queue 228. Controlling rates at which data units are transferred from the ingress queues 228 to the egress portions 204-xb are described in more detail below.

The egress portion 204-xb comprises circuitry 248 (sometimes referred to herein as "traffic manager circuitry 248") that is configured to control the flow of data units from the ingress portions 204-xa to one or more other components of the egress portion 204-xb. The egress portion 204-xb is coupled to an egress buffer memory 252 that is configured to store egress buffers. A buffer manager (not shown) within the traffic manager circuitry 248 temporarily stores data units received from one or more ingress portions 204-xa in egress buffers as they await processing by one or more other components of the egress portion 204-xb. The buffer manager of the traffic manager circuitry 248 is configured to operate in a manner similar to the buffer manager of the ingress arbiter 220 discussed above.

The egress buffer memory 252 (and buffers of the egress buffer memory 252) is structured the same as or similar to the ingress buffer memory 224 (and buffers of the ingress buffer memory 224) discussed above. For example, each data unit received by the egress portion 204-xb is stored in one or more entries within one or more buffers, which entries are marked as utilized to prevent newly received data units from overwriting data units that are already buffered in the egress buffer memory 252. After a data unit is released to from the egress buffer memory 252, the one or more entries in which the data unit is buffered in the egress buffer memory 252 are then marked as available for storing newly received data units, in some embodiments.

Generally, buffers in the egress buffer memory 252 comprises a variety of buffers or sets of buffers, each utilized for varying purposes and/or components within the egress portion 204-xb.

The buffer manager (not shown) is configured to manage use of the egress buffers 252. The buffer manager performs, for example, one of or any suitable combination of the following: allocates and deallocates specific segments of memory for buffers, creates and deletes buffers within that memory, identifies available buffer entries in which to store a data unit, maintains a mapping of buffers entries to data units stored in those buffers entries (e.g., by a packet sequence number assigned to each packet when the first the first data unit in that packet was received), marks a buffer entry as available when a data unit stored in that buffer is dropped, sent, or released from the buffer, determines when a data unit is to be dropped because it cannot be stored in a buffer, performs garbage collection on buffer entries for data units (or portions thereof) that are no longer needed, etc., in various embodiments.

The traffic manager circuitry 248 is also configured to maintain egress queues 256, according to some embodiments, that are used to manage the order in which data units are processed from the egress buffers 252. The egress queues 256 are structured the same as or similar to the ingress queues 228 discussed above.

In an embodiment, different egress queues 256 may exist for different destinations. For example, each port 212 is associated with a respective set of one or more egress queues 256. The egress queue 256 to which a data unit is assigned may, for instance, be selected based on forwarding information indicating the target port determined for the packet should.

In some embodiments, different egress queues 256 correspond to respective flows or sets of flows. That is, packets for each identifiable traffic flow or group of traffic flows is assigned a respective set of one or more egress queues 256. In some embodiments, different egress queues 256 correspond to different classes of traffic, QoS levels, etc.

In some embodiments, egress queues 256 correspond to respective egress ports 212 and/or respective priority sets. For example, a respective set of multiple queues 256 corresponds to each of at least some of the egress ports 212, with respective queues 256 in the set of multiple queues 256 corresponding to respective priority sets.

Generally, when the egress portion 204-xb receives packets from ingress portions 204-xa via the interconnect 116, the traffic manager circuitry 248 stores (or "enqueues") the packets in egress queues 256.

The ingress buffer memory 224 corresponds to a same or different physical memory as the egress buffer memory 252, in various embodiments. In some embodiments in which the ingress buffer memory 224 and the egress buffer memory 252 correspond to a same physical memory, ingress buffers 224 and egress buffers 252 are stored in different portions of the same physical memory, allocated to ingress and egress operations, respectively.

In some embodiments in which the ingress buffer memory 224 and the egress buffer memory 252 correspond to a same physical memory, ingress buffers 224 and egress buffers 252 include at least some of the same physical buffers, and are separated only from a logical perspective. In such an embodiment, metadata or internal markings may indicate whether a given individual buffer entry belongs to an ingress buffer 224 or egress buffer 252. To avoid contention when distinguished only in a logical sense, ingress buffers 224 and egress buffers 252 may be allotted a certain number of entries in each of the physical buffers that they share, and the number of entries allotted to a given logical buffer is said to be the size of that logical buffer. In some such embodiments, when a packet is transferred from the ingress portion 204-xa to the egress portion 204-xb within a same packet processing module 204, instead of copying the packet from an ingress buffer entry to an egress buffer, the data unit remains in the same buffer entry, and the designation of the buffer entry (e.g., as belonging to an ingress queue versus an egress queue) changes with the stage of processing.

The egress portion 204-xb also includes an egress packet processor 268 that is configured to perform egress processing operations for packets such as one of, or any suitable combination of two or more of: packet duplication (e.g., for multicast packets), header alteration, rate limiting, traffic shaping, egress policing, flow control, maintaining statistics regarding packets, etc., according to various embodiments. As an example, when a header of a packet is to be modified (e.g., to change a destination address, add a tunneling header, remove a tunneling header, etc.) the egress packet processor 268 modifies header information in the egress buffers 252, in some embodiments.

In an embodiment, the egress packet processor 268 is coupled to a group of egress ports 212 via egress arbitration circuitry 272 that is configured to regulate access to the group of egress ports 212 by the egress packet processor 268.

In some embodiments, the egress packet processor 268 is additionally or alternatively coupled to suitable destinations for packets other than egress ports 212, such as one or more internal central processing units (not shown), one or more storage subsystems, etc.

In the course of processing a data unit, the egress packet processor 268 may replicate a data unit one or more times. For example, a data unit may be replicated for purposes such as multicasting, mirroring, debugging, and so forth. Thus, a single data unit may be replicated, and stored in multiple egress queues 256. Hence, though certain techniques described herein may refer to the original data unit that was received by the network device 200, it will be understood that those techniques will equally apply to copies of the data unit that have been generated by the network device for various purposes. A copy of a data unit may be partial or complete. Moreover, there may be an actual physical copy of the data unit in egress buffers 252, or a single copy of the data unit 252 may be linked from a single buffer location (or single set of locations) in the egress buffers 252 to multiple egress queues 256.

Many communication protocols tolerate some degree of data loss along the path from sender to recipient (e.g., by the message recipient or an intermediary ignoring dropped data units and/or requesting that those dropped data units be resent). However, in certain protocols or contexts, it is important to minimize or altogether avoid data loss. For example, "lossless" (also referred to as "zero-loss") protocols are often used to provide constant, uninterrupted communications at lower network levels in support of certain mission critical network-based applications. Examples of such applications include without limitation, Remote Direct Memory Access ("RDMA") and Fiber Channel over Ethernet ("FCoE"), both often used in data centers.

Systems supporting lossless protocols are generally configured to ensure that any data units in a lossless data stream that arrive at the system are not dropped. Of course, there are physical limitations on the amount of lossless communication a given system may support. Thus, though such protocols are referred to as "lossless," it will be recognized that at least some of these protocols may include provisions for handling at least some data loss.

Data Center Bridging ("DCB") is an example of a family of network protocols intended to provide lossless communications. DCB is more particularly aimed at the Ethernet or link layer. DCB includes Data Center Ethernet ("DCE") and Converged Enhanced Ethernet ("CEE"). CEE includes, in addition to PFC, Enhanced Transmission Selection ("ETS") (IEEE 802.1Qaz), which provides a common management framework for assignment of bandwidth to frame priorities, and Congestion Notification (IEEE 802.1Qau), which provides end to end congestion management for protocols that are capable of limiting transmission rate to avoid frame loss.

Of course, a variety of other lossless protocols and mechanisms exist, and the techniques described herein are not particular to any specific lossless protocol unless otherwise stated. Moreover, certain techniques described herein may also provide advantages in systems and/or with traffic that do not support lossless communications, though additional benefits may be realized with lossless communications.

The traffic manager circuitry 248 comprises congestion notification circuitry 280. The congestion notification circuitry 280 is configured to determine when one or more measures indicate congestion related to the egress buffer memory 252. In some embodiments, the congestion notification circuitry 280 is configured to generate measures that indicate congestion related to the egress buffer memory 252 due to packet data from respective ingress sources, such as respective ingress ports 208, respective ingress port 208—priority set pairs, etc.

For example, congestion notification circuitry 280 determines when an amount of memory space in the egress buffer memory 252 that stores packet data from a particular ingress source (e.g., a particular ingress port 208, a particular ingress port 208-priority set pair, etc.) indicates congestion of the egress buffer memory 252 related to that ingress source, in an embodiment. For example, the congestion notification circuitry 280 is configured to compare the amount of memory space utilized for packet data from the ingress source to a threshold. The threshold may be global for all ingress sources, different for different types of ingress sources, or different even among the same type of ingress source. In some embodiments, thresholds are programmable, reconfigurable, and/or dynamically adjusted.

When the amount of space utilized for packet data from the ingress source is above the threshold, the congestion notification circuitry 280 determines that the egress buffer memory 252 is congested with regard to packet data from the ingress source, in an embodiment. When the amount of space utilized for packet data from the ingress source falls below the threshold, the congestion notification circuitry 280 determines that the egress buffer memory 252 is not congested with regard to packet data from the ingress source. In an embodiment, the congestion notification circuitry 280 is configured to use different thresholds depending on a congestion state of the egress buffer memory 252. For example, when the egress buffer memory 252 is in a not congested state with regard to packet data from the ingress source the congestion notification circuitry 280 compares the amount of space utilized for packet data from the ingress source is to a first threshold to determine whether the egress buffer memory 252 has transitioned to a congested state; and when the egress buffer memory 252 is in the congested state the congestion notification circuitry 280 compares the amount of space utilized for packet data from the ingress source to a second threshold to determine whether the egress buffer memory 252 has transitioned to the not congested state with regard to packet data from the ingress source, where the second threshold is lower than the first threshold.

The congestion notification circuitry 280 compares an indication of an amount of space being utilized to the appropriate threshold whenever it is necessary to determine whether there is congestion, in an embodiment. In other embodiments, the congestion notification circuitry 280 is configured to perform comparisons at some frequency (e.g., every other clock cycle, whenever the count information is updated, etc.) and to determine the resulting states (e.g., congested or not congested).

In other embodiments, the congestion notification circuitry 280 additionally or alternatively is configured to compare input rates and output rates to determine when the egress buffer memory 252 is in a congested state with regard to packet data from the ingress source. For instance, the congestion notification circuitry 280 determines an amount of data units received at the traffic manager circuitry 248 from the particular ingress source during a particular duration of time, and further measures the number of data units from the ingress source that the traffic manager circuitry 248 releases from the egress buffer memory 252 during that particular duration of time. When the number of data units received over that particular duration of time exceeds the number of data units released by more than a threshold amount, the entity is determined to be in a congested state, in an embodiment.

As another example, the congestion notification circuitry 280 additionally or alternatively is configured to determine a rate of change of a difference between an input rate and an output rate with regard to an ingress source, and to use the rate of change to determine when the egress buffer memory 252 is in a congested state with regard to packet data from the ingress source, in an embodiment.

In other embodiments, other suitable techniques are additionally or alternatively used to determine when the egress buffer memory 252 is in a congested state with regard to packet data from an ingress source, and the techniques described herein are not limited to a specific mechanism for detecting congestion unless otherwise stated. Moreover, it will be noted that different congestion thresholds and states may exist for different purposes.

Figure 3A:
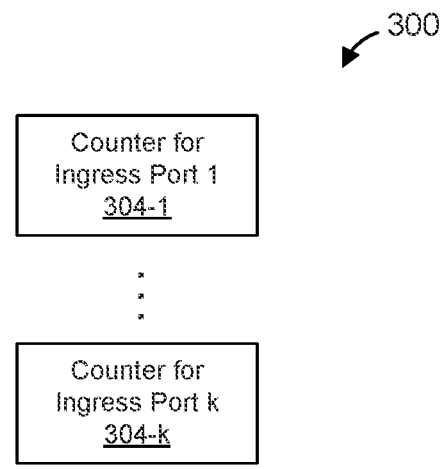
FIG. 3A is a simplified block diagram of a set of counters maintained by the network device of FIG. 2, according to an embodiment.

FIG. 3A is a simplified block diagram of a set 300 of counters maintained by the congestion notification circuitry 280 for the egress buffer memory 252, according to an embodiment. The congestion notification circuitry 280 uses the set 300 of counters to determine congestion of the egress buffer memory 252 due to respective ingress ports 208, in an embodiment. In other embodiments, the congestion notification circuitry 280 does not include counters such as the set 300 of counters, but rather determines congestion of the egress buffer memory 252 due to respective ingress ports 208 using another suitable mechanism.

The set 300 of counters includes a respective counter 304 for each of multiple ingress ports 208. In connection with the congestion notification circuitry 280 determining that a data unit has been enqueued in the egress buffer memory 252, the congestion notification circuitry 280 determines the ingress port 208 from which the data unit was received and then increments the corresponding counter 304. Additionally, in connection with the congestion notification circuitry 280 determining that a data unit has been dequeued from the egress buffer memory 252, the congestion notification circuitry 280 determines the ingress port 208 from which the data unit was received and then decrements the corresponding counter 304.

Figure 3B:
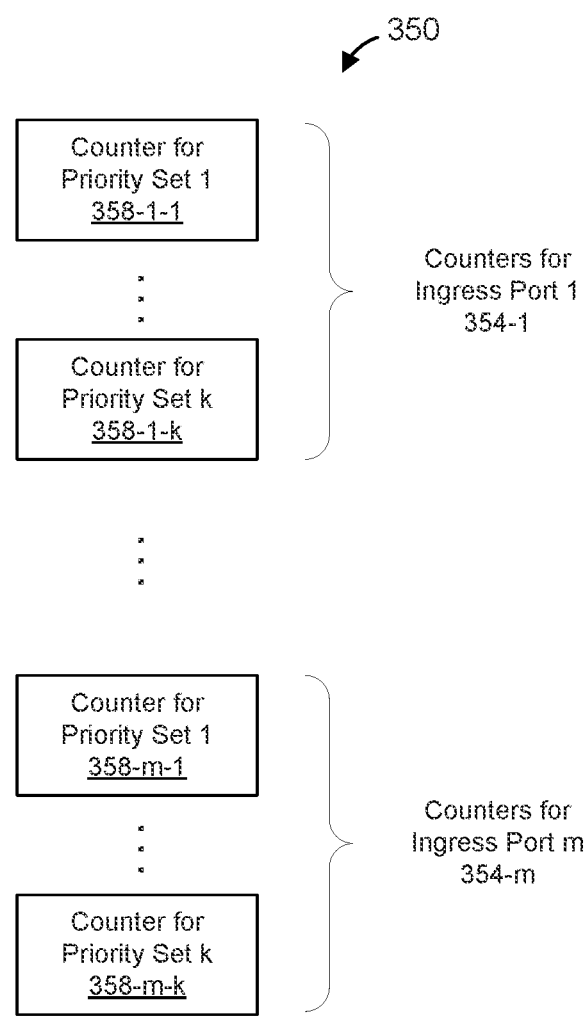
FIG. 3B is a simplified block diagram of another set of counters maintained by the network device of FIG. 2, according to another embodiment.

FIG. 3B is a simplified block diagram of a set 350 of counters maintained by the congestion notification circuitry 280 for the egress buffer memory 252, according to another embodiment. The congestion notification circuitry 280 uses the set 350 of counters to determine congestion of the egress buffer memory 252 due to respective ingress port 208/priority set pairs, in an embodiment. In other embodiments, the congestion notification circuitry 280 does not include counters such as the set 350 of counters, but rather determines congestion of the egress buffer memory 252 due to respective ingress port 208/priority set pairs using another suitable mechanism.

The set 350 of counters includes a respective subset 354 of one or more counters for each of multiple ingress ports 208. Each subset 354 includes one or more counters 358 corresponding to one or more respective priority sets. In connection with the congestion notification circuitry 280 determining that a data unit has been enqueued in the egress buffer memory 252, the congestion notification circuitry 280 determines the ingress port 208 from which the data unit was received and the priority set to which the data unit corresponds; and the congestion notification circuitry 280 then increments the corresponding counter 358. Additionally, in connection with the congestion notification circuitry 280 determining that a data unit has been dequeued from the egress buffer memory 252, the congestion notification circuitry 280 determines the ingress port 208 from which the data unit was received and the priority set to which the data unit corresponds; and the congestion notification circuitry 280 then decrements the corresponding counter 358.

Although FIG. 3B illustrates each subset 354 as including k counters 358, in other embodiments each subset 354 need not include a same number of counters 358.

In some embodiments, the congestion notification circuitry 280 is reconfigurable to use counters, such as the counters 304 and 358 of FIGS. 3A-B, in different ways, such as to count as illustrated in FIG. 3A and to count as illustrated in FIG. 3B, or some other suitable manner.

Referring again to FIG. 2, the congestion notification circuitry 280 is configured to: in response to determining a congested state due to an ingress source, send a first flow control message to an ingress portion 204-xa corresponding to the ingress source. The first flow control message (sometimes referred to herein as a "congestion" message) indicates to the ingress portion 204-xa that the ingress portion 204-xa should pause sending, to the egress portion 204-xb, data units from the ingress source. In some embodiments, each congestion message indicates an ingress port 208 from which the ingress portion 204-xa should pause sending data unit to the egress portion 204-xb. In some embodiments, each congestion message also indicates a priority set, from which the ingress portion 204-xa should pause sending data units to the egress portion 204-xb. In some embodiments, each congestion message indicates an ingress queue 228 from which the ingress portion 204-xa should pause sending packets to the egress portion 204-xb. For example, the ingress queue 228 corresponds to an ingress port 208/priority set pair from which the ingress portion 204-xa should pause sending packets.

In other embodiments, each congestion message additionally or alternatively indicates an egress entity that is contributing to the congestion of the egress buffer memory 252, such as an egress queue 256 that is receiving packets from the ingress source and that is congested, an egress port 212 that is receiving packets from the ingress source and that is congested, etc.

In an embodiment, the congestion notification circuitry sends the congestion message to the ingress portion 204-xa that corresponds to the ingress source. In other embodiments, the congestion notification circuitry sends the congestion message to all ingress portions 204-xa. In other embodiments, the congestion notification circuitry sends the congestion message to a subset of the ingress portions 204-xa, such as to one or more ingress portions 204-xa that the congestion notification circuitry 280 determines are sending data units to the egress buffer memory 252.

The congestion notification circuitry 280 is configured to: in response to determining that the egress buffer memory 252 is no longer in the congested state due to the ingress source (i.e., has transitioned from the congested state to the not congested state with regard to the ingress source), send a second flow control message to the ingress portion 204-xa corresponding to the ingress source. The second flow control message (sometimes referred to herein as an "no congestion" message) indicates to the ingress portion 204-xa that the ingress portion 204-xa should resume sending, to the egress portion 204-xb, data units from the ingress source.

In some embodiments, each no congestion message indicates an ingress port 208 from which the ingress portion 204-xa should resume sending packets to the egress portion 204-xb. In some embodiments, each no congestion message also indicates a priority set of which the ingress portion 204-xa should resume sending packets to the egress portion 204-xb. In some embodiments, each no congestion message indicates an ingress queue 228 from which the ingress portion 204-xa should resume sending packets to the egress portion 204-xb. For example, the ingress queue 228 corresponds to an ingress port 208/priority set pair from which the ingress portion 204-xa should resume sending packets.

In other embodiments, each no congestion message additionally or alternatively indicates an egress entity that is no longer congested, such as an egress queue 256 within the egress buffer memory 252, an egress port 212 for which data units are stored in the egress buffer memory 252, etc.

In an embodiment, the congestion notification circuitry sends the no congestion message to the ingress portion 204-xa that corresponds to the ingress source. In other embodiments, the congestion notification circuitry sends the no congestion message to all ingress portions 204-xa. In other embodiments, the congestion notification circuitry sends the no congestion message to a subset of the ingress portions 204-xa, such as to one or more ingress portions 204-xa to which the congestion notification circuitry 280 previously sent the congestion message, to one or more ingress portions 204-xa that the congestion notification circuitry 280 determines are/were sending data units to the egress buffer memory 252, etc.

As discussed above, in some embodiments the first flow control message (congestion message) includes an indication of an egress entity that is contributing to the congestion of the egress buffer memory 252. In various embodiments, the indication of the egress entity that is contributing to the congestion of the egress buffer memory 252 comprises one of, or any suitable combination of two or more of: an indication of a set of one or more target ports 212 that are receiving packets from the ingress source and that are congested, an indication of one or more egress queues 256 that are receiving packets from the ingress source and that are congested, etc.

Referring again to the rate control circuitry 236 of the ingress portion 204-*xa*, the rate control circuitry 236 is configured to: in response to receiving the first flow control message (congestion message) from one of the congestion notification circuitry 280, pause sending data units corresponding to the ingress source. In an embodiment, the rate control circuitry 236 is configured to: in response to receiving the first flow control message (congestion message) from one of the congestion notification circuitry 280, pause sending data units corresponding to the ingress source to the egress portion 204-*xb* that sent the congestion message.

Additionally, the rate control circuitry 236 is configured to: in response to receiving the second flow control message (no congestion message) from one of the congestion notification circuitry 280, resume sending data units from the ingress source. In an embodiment, the rate control circuitry 236 is configured to: in response to receiving the second flow control message (no congestion message) from one of the congestion notification circuitry 280, resume sending data units from the ingress source to the egress portion 204-*xb* that sent the no congestion message.

In some embodiments, the rate control circuitry 236 uses information in a congestion message to determine an ingress queue 228 from which to pause sending packet data. For example, in some embodiments in which the congestion message includes an indication of an ingress port 208/priority set pair, the rate control circuitry 236 uses the indication of the ingress port 208/priority set pair to determine that sending data units from an ingress queue 228 that corresponds to the ingress port 208/priority set pair to the egress portion 204-*xb* is to be paused. As another example, in some embodiments in which the congestion message includes an indication of an ingress port 208, the rate control circuitry 236 uses the indication of the ingress port 208 to determine that sending data units from an ingress queue 228 corresponding to the ingress port 208 to the egress portion 204-*xb* is to be paused. As another example, in some embodiments in which the congestion message includes an indication of the ingress queue 228, the rate control circuitry 236 uses the indication of the ingress queue 228 to determine that sending data units from the ingress queue 228 to the egress portion 204-*xb* is to be paused.

Similarly, in some embodiments, the rate control circuitry 236 uses information in an no congestion message to determine an ingress queue 228 from which to resume sending packet data. For example, in some embodiments in which the no congestion message includes an indication of an ingress port 208/priority set pair, the rate control circuitry 236 uses the indication of the ingress port 208/priority set pair to determine that sending data units from an ingress queue 228 that corresponds to the ingress port 208/priority set pair to the egress portion 204-*xb* is to be resumed. As another example, in some embodiments in which the congestion message includes an indication of an ingress port 208, the rate control circuitry 236 uses the indication of the ingress port 208 to determine that sending data units from an ingress queue 228 corresponding to the ingress port 208 to the egress portion 204-*xb* is to be resumed. As another example, in some embodiments in which the no congestion message includes an indication of the ingress queue 228, the rate control circuitry 236 uses the indication of the ingress queue 228 to determine that sending data units from the ingress queue 228 is to be resumed.

Figure 4:
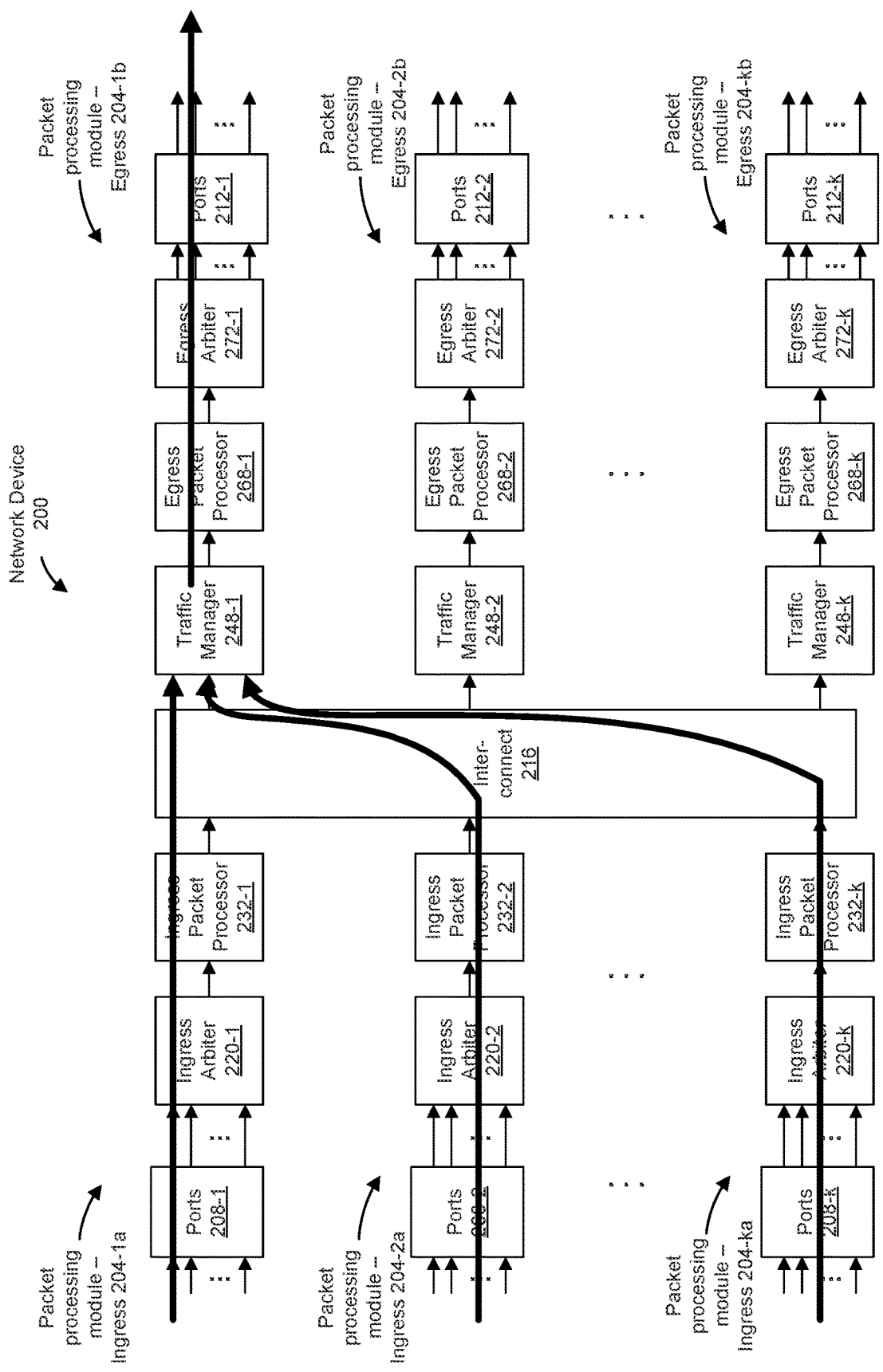
FIG. 4 is a simplified block diagram of the network device of FIG. 2 showing flows of packets through the network device, according to an embodiment.

FIG. 4 is a simplified block diagram of the network device 200 of FIG. 2 showing flows of packets corresponding to a single entity, such as a particular egress port 212, a particular egress buffer 252, a particular egress queue 256, a particular set of egress queues 256, etc., according to an embodiment. For example, dark arrows in FIG. 4 show flows of packets corresponding to the single entity through multiple ingress portions 204-*xa*, the interconnect 216, and the egress portion 204-1*b*.

In the example illustrated in FIG. 4, packets that eventually are transmitted via a single egress port 212 are received at multiple ingress portions 204-*xa*. These packets are transferred through the interconnect 216 to the egress portion 204-1*b*, and eventually transmitted by the single egress port 212.

When congestion notification circuitry 280-1 in the egress portion 204-1*b* determines that an entity corresponding to the single egress port 212 (e.g., the port 212, an egress buffer 252, an egress queue 256, etc.) has become congested, the congestion notification circuitry 280-1 sends the first flow control message (e.g., the congestion message) to the multiple ingress portions 204-*xa*. In response to the multiple ingress portions 204-*xa* receiving the first flow control message, the multiple ingress portions 204-*xa* pause sending data units corresponding to the entity to the egress portion 204-1*b*.

When the congestion notification circuitry 280-1 in the egress portion 204-1*b* later determines that the entity corresponding to the single egress port 212 (e.g., the port 212, an egress buffer 252, an egress queue 256, a transmit queue, etc.) is no longer congested, the congestion notification circuitry 280-1 sends the second flow control message (e.g., the no congestion message) to the multiple ingress portions 204-*xa*. In response to the multiple ingress portions 204-*xa* receiving the second flow control message, the multiple ingress portions 204-*xa* resume sending data units corresponding to the entity to the egress portion 204-1*b*.

To improve efficient use of the egress buffer memories 252, the rate control circuitry 236 of the ingress portion 204-*xa* is configured to progressively increase over time a rate at which data units corresponding to an ingress source are transferred from an ingress buffer 224 to the egress portion 204-*xb* (sometimes referred to herein as "progressive queue pacing") in response to receiving the second flow control message. When each of multiple ingress portions 204-*xa* progressively increase over time a rate at which data units corresponding to the entity are transferred from a respective ingress source to the egress portion 204-*xb*, efficient use of the egress buffer memories 252 is improved, at least in some embodiments.

Thus, the rate control circuitry 236 of the ingress portion 204-*xa* is configured to control rates at which packets are transferred from the ingress buffers 224 to the egress portions 204-*xb*. In some embodiments, controlling rates at which packets are transferred from the ingress buffers 224 to the egress portions 204-*xb* comprises controlling a rate at which packet data corresponding to an ingress port 208/priority set pair are transferred from an ingress buffer 224 to an egress portion 204-*xb* that sent an no congestion message (or to multiple egress portions 204-*xb*). In some embodiments, controlling rates at which packets are transferred from the ingress buffers 224 to the egress portions 204-*xb* comprises controlling a rate at which packet data corresponding to an ingress port 208 are transferred from an ingress buffer 224 to an egress portion 204-*xb* that sent an no congestion message (or to multiple egress portions 204-*xb*). In some embodiments, controlling rates at which packets are transferred from the ingress buffers 224 to the egress portions 204-*xb* comprises controlling a rate at which packet data are transferred from an ingress queue 228 to an egress portion 204-*xb* that sent an no congestion message (or to multiple egress portions 204-*xb*).

Figure 5A:
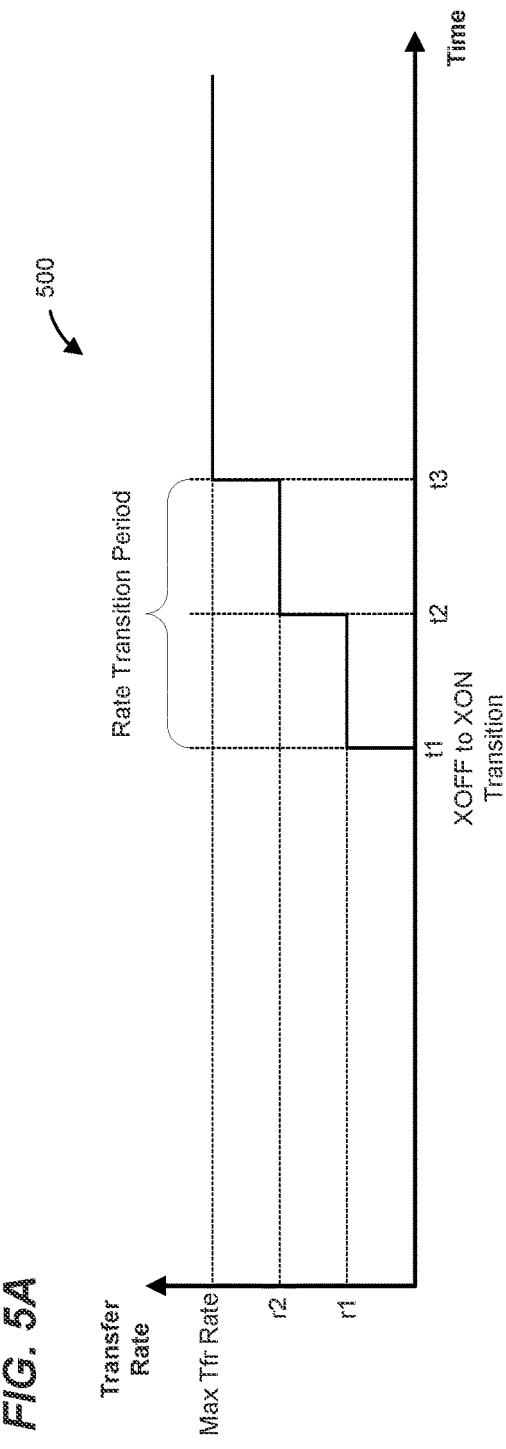
FIG. 5A is a plot of rates over time at which data units are transferred between components of the network device of FIG. 2, according to an embodiment.

FIG. 5A is a plot 500 of rates at which the ingress portion 204-*xa* transfers data units corresponding to a particular ingress source from an ingress buffer 224 to one or more egress portions 204-*xb* over time, according to an embodiment. The rate control circuitry 236 is configured to control the rate of transfer in a manner illustrated in the plot 500, in an embodiment.

Prior to a time t1, an egress buffer memory 252 is in a congested state and thus the ingress portion 204-*xa* does not transfer any data units corresponding to a particular ingress source to the egress portion 204-*xb*. Thus, the transfer rate is zero prior to time t1.

At time t1, the rate control circuitry 236 determines that the egress buffer memory 252 has transitioned from the congested state to the not congested state, according to an embodiment. For example, the rate control circuitry 236 determines that the egress buffer memory 252 has transitioned from congested to not congested in response to receiving the second flow control message discussed above, in some embodiments.

In response to determining that the egress buffer memory 252 has transitioned from congested to not congested, the rate control circuitry 236 controls the ingress portion 204-*xa* to begin transferring data units corresponding to the ingress source from an ingress queue 228 corresponding to the ingress source to the egress portion 204-*xb* (via the interconnect 216) at a transfer rate r1, which is approximately ⅓ of a maximum transfer rate that the ingress portion 204-*xa* and the interconnect 216 are capable of transferring data units to the egress portion 204-*1b*. Accordingly, at time t1, the ingress portion 204-*xa* begins transferring data units corresponding to the ingress source from the ingress queue 228 to the egress portion 204-*xb* (via the interconnect 216) at the transfer rate r1.

Subsequently, at a time t2, the rate control circuitry 236 controls the ingress portion 204-*xa* to begin transferring data units corresponding to the ingress source from the ingress queue 228 to the egress portion 204-*xb* (via the interconnect 216) at a transfer rate r2, which is approximately ⅔ of the maximum transfer rate that the ingress portion 204-*xa* and the interconnect 216 are capable of transferring data units to the egress portion 204-*1b*. Accordingly, at time t2, the ingress portion 204-*xa* begins transferring data units corresponding to the ingress source from the ingress queue 228 to the egress portion 204-*xb* (via the interconnect 216) at the transfer rate r2.

Next, at a time t3, the rate control circuitry 236 controls the ingress portion 204-*xa* to begin transferring data units corresponding to the ingress source from the ingress queue 228 to the egress portion 204-*xb* (via the interconnect 216) at the maximum transfer rate that the ingress portion 204-*xa* and the interconnect 216 are capable of transferring data units to the egress portion 204-*1b*. Accordingly, at time t3, the ingress portion 204-*xa* begins transferring data units corresponding to the ingress source from the ingress queue 228 to the egress portion 204-*xb* (via the interconnect 216) at the maximum transfer rate.

As can be seen in FIG. 5A, the rate of transfer is progressively increased over time during a rate transition period in equal sized steps.

Figure 5B:
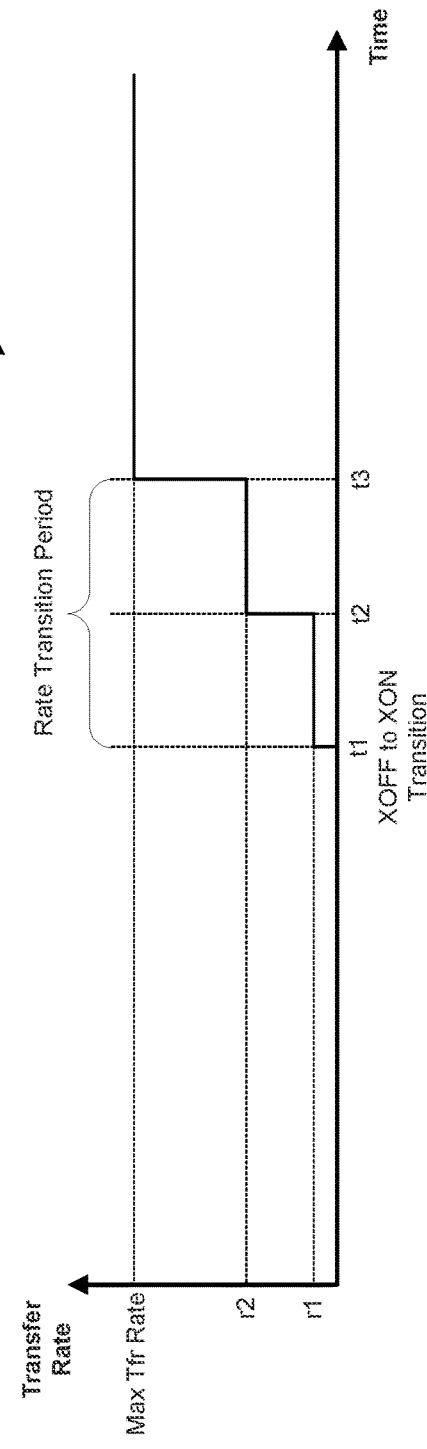
FIG. 5B is a plot of rates over time at which data units are transferred between components of the network device of FIG. 2, according to another embodiment.

FIG. 5B is a plot 550 of rates at which the ingress portion 204-*xa* transfers data units corresponding to a particular ingress source from an ingress queue 228 to the egress portion 204-*xb* over time, according to another embodiment. The rate control circuitry 236 is configured to control the rate of transfer in a manner illustrated in the plot 550, in an embodiment.

The plot 550 is similar to the plot 500 of FIG. 5A. For example, the rate of transfer is progressively increased over time during a rate transition period. In the example of FIG. 5B, however, the rate of transfer is progressively increased in non-equal steps. In particular, a size of each step progressively increases over time, i.e., (r2−r1)>r1, and (maximum transfer rate−r2)>(r2−r1).

Although the examples illustrated in FIGS. 5A-B have three steps during the rate transition period, the rate transition period has other suitable numbers of steps (e.g., 2, 4, 5, 6, . . . ) in other embodiments.

In other embodiments, increases in the rate of transfer are progressively decreased in non-equal steps during the rate transition period. For example, when the rate transition period includes three steps, r1>(r2−r1), and (r2−r1)>(maximum transfer rate−r2). In other embodiments, multiple steps during the rate transition period have a same first rate increase, whereas one or more other steps during the rate transition period have one or more rate increases that are different than the first rate increase.

To further improve efficient use of buffer memory, each of multiple ones of the ingress portions 204-*xa* wait a different respective delay period before resuming the transfer of data units, at least in some embodiments.

Figure 6:
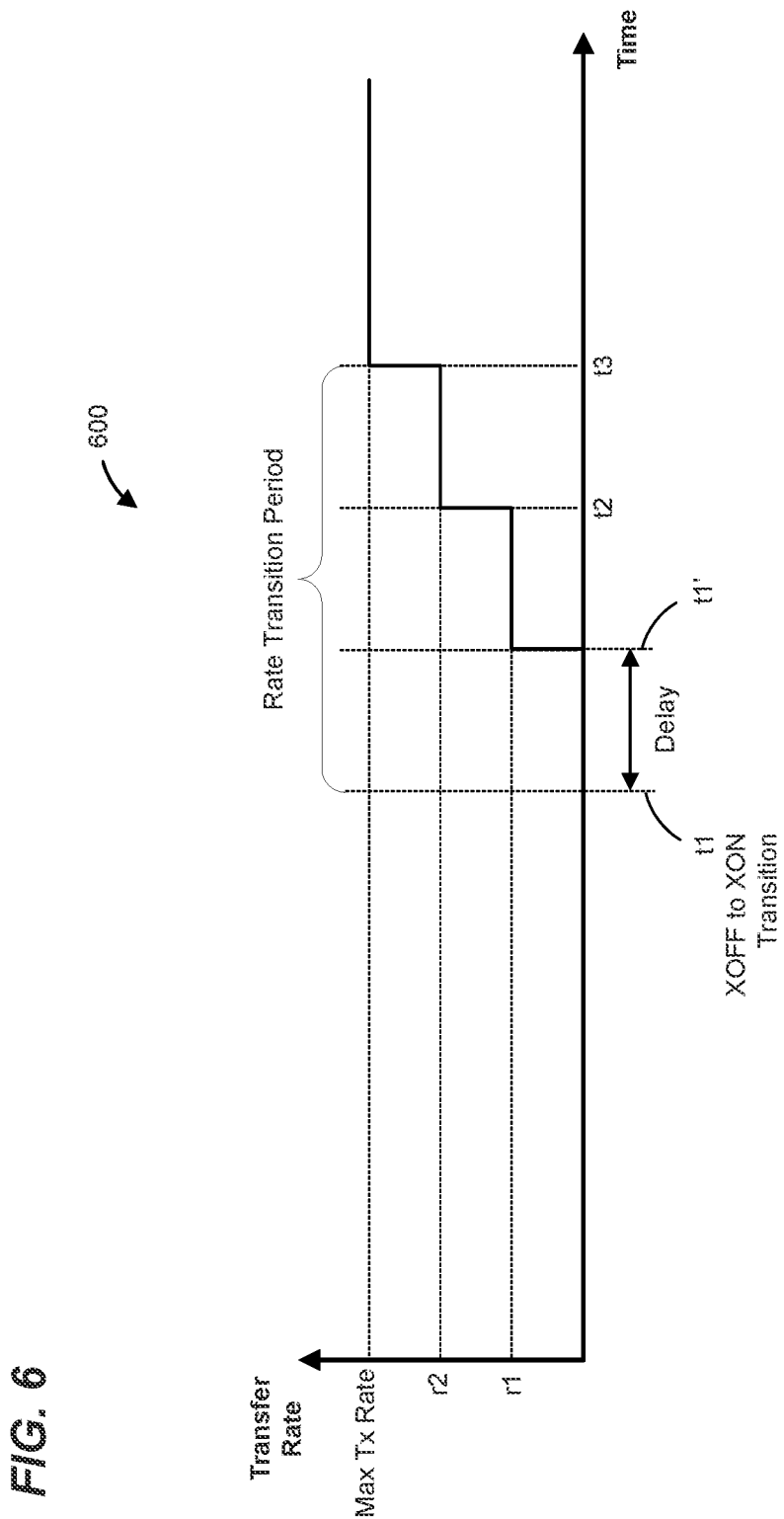
FIG. 6 is a plot of rates over time at which data units are transferred between components of the network device of FIG. 2, according to yet another embodiment.

FIG. 6 is a plot 600 of rates at which the ingress portion 204-*xa* transfers data units corresponding to a particular ingress source from an ingress queue 228 to the egress portion 204-*xb* over time, according to another embodiment. The rate control circuitry 236 is configured to control the rate of transfer in a manner illustrated in the plot 600, in an embodiment.

The plot 600 is similar to the plot 500 of FIG. 5A. For example, the rate of transfer is progressively increased over time during a rate transition period. In the example of FIG. 6, however, the rate does not begin increasing immediately in response to the entity transitioning from congested to not congested at time t1. Rather, the ingress portion 204-*xa* waits a delay period (i.e., t1'-t1) before beginning the progressive increase in transfer rates.

In some embodiments, the rate control circuitry 236 of each ingress portion 204-*xa* sets the delay time period for each congested to not congested transition for any of multiple entities to a pseudo-randomly determined value. In such embodiments, each ingress portion 204-*xa* is likely to choose a different delay period for any particular congested to not congested transition and thus each ingress portion 204-*xa* is likely to resume transferring data units corresponding to the entity at a different time.

In other embodiments, the rate control circuitry 236 of each ingress portion 204-*xa* sets the delay time period to a pseudo-randomly determined value, and the ingress portion 204-*xa* uses the determined delay time period for multiple different congested to not congested transitions for one or more entities for a time duration. Then, the rate control circuitry 236 sets the delay time period to another pseudo-randomly determined value, and the ingress portion 204-*xa* uses the newly determined delay time period for multiple different congested to not congested transitions for a subsequent time duration, and so on. In such embodiments, each ingress portion 204-*xa* is likely to use a different delay period for any particular congested to not congested transition and thus each ingress portion 204-*xa* is likely to resume transferring data units corresponding to the entity at a different time.

In some embodiments, each rate control circuitry 236 includes a pseudo-random number generator (PNG) that the rate control circuitry 236 uses to generate the delay time period. In other embodiments, multiple rate control circuitries 236 of multiple ingress portions 204-*xa* share a single PNG, and all of the multiple rate control circuitries 236 use the single PNG to generate the delay times. In other embodiments, another component (such as a CPU of the network device 200, a controller of the network device 200, etc.) includes a PNG and the other component of the network device 200 provides pseudo-randomly generated numbers to multiple rate control circuitries 236, which use the pseudo-randomly generated numbers to determine the delay time periods. In other embodiments, the other component (such as the CPU of the network device 200, the controller of the network device 200, etc.) uses the PNG to generate delay time periods and the other component of the network device 200 provides the generated delay time periods to multiple rate control circuitries 236.

In other embodiments, the congestion notification circuitry 280 in the egress portion 204-*xb* delays, by different respective delay periods, the transmission of respective no congestion messages to respective ingress portions 204-*xa*, thus delaying, by the different delay periods, when the respective ingress portions 204-*xa* resume transferring packet data to the egress portion 204-*xb*. In various embodiments, the congestion notification circuitry 280 determines the different respective time periods according to various techniques similar to those discussed above. In some such embodiments, the congestion notification circuitry 280 includes a PNG and uses the PNG to determine the different respective delay time periods.

Referring now to FIGS. 5A-B and 6, the time durations between increases in the transfer rate (e.g., t2-t1, t2-t1', and t3-2) is any suitable time duration, in various embodiments.

In some embodiments, the congestion notification circuitry 280 determines intermediate transfer rates (e.g., r1 and r2 in the examples of FIGS. 5A-B and 6) and/or numbers of steps to be used by the ingress portions 204-*xa* and communicates the determined intermediate transfer rates and/or numbers of steps to the ingress portions 204-*xa*, for example in the no congestion message, in the congestion message, and/or separately from the no congestion message and the congestion message. For example, the congestion notification circuitry 280 determines a number of ingress ports 208 (or ingress queues 228) at which packets corresponding to the congested entity are being received, and uses the determined number of ingress ports 208 (or ingress queues 228) to determine intermediate transfer rates and/or numbers of steps to be used by the ingress portions 204-*xa*. In some embodiments, the congestion notification circuitry 280 determines the intermediate transfer rates and/or numbers of steps to be used by the ingress portions 204-*xa* additionally using a determined fill level of an egress queue 256 corresponding to the congested entity.

Each rate control circuitry 236 then uses the intermediate transfer rates and/or numbers of steps determined by the congestion notification circuitry 280.

In other embodiments, the congestion notification circuitry 280 determines the number of ingress ports 208 (or ingress queues 228) at which packets corresponding to the congested entity are being received, and communicates the determined number of ingress ports 208 (or ingress queues 228) to the ingress portions 204-*xa*, for example in the no congestion message, in the congestion message, and/or separately from the no congestion message and the congestion message. Each rate control circuitry 236 then uses the determined number of ingress ports 208 (or ingress queues 228) to determine intermediate transfer rates and/or numbers of steps to be used by the rate control circuitry 236.

In some embodiments, the congestion notification circuitry 280 additionally provides to the ingress portions 204-*xa* a determined fill level of an egress queue 256 corresponding to the congested entity, and each rate control circuitry 236 also uses the fill level of the egress queue 256 to determine intermediate transfer rates and/or numbers of steps to be used by the rate control circuitry 236.

The rate control circuitry 236 controls the rate at which packet data is transferred to the egress portion 204-*xb* by, for example, rather than transferring a data unit (or a portion thereof) from an ingress queue 228 each clock cycle, dequeuing a data unit (or a portion thereof) from the ingress queue 228 every N clock cycles, where N is a suitable integer greater than one. Any of a variety of mechanisms may be utilized for controlling the rate at which packet data is transferred to the egress portion 204-*xb* such as throttling, shaping, or pacing the release of packet data from ingress queues 228. In an embodiment, when it comes time to selecting a next unit of packet data to release, the ingress arbitrator circuitry 220 utilizes a suitable prioritization mechanism, such as selecting an ingress queue 228 from amongst a set of ingress queues 228 corresponding to respective priority sets. This selection process, which may occur from once to any number of times during a clock cycle, normally results in the ingress arbitrator circuitry 220 dequeuing a data unit from a particular ingress queue 228. However, in an embodiment, when the ingress queue 228 corresponds to an entity for which the transfer rate is being controlled, the rate control circuitry 236 blocks dequeuing from the ingress queue 228 if the dequeuing would cause the transfer rate to exceed its controlled rate.

The rate control circuitry 236 controls the transfer rate in a variety of manners, in various embodiments. For example, rate control circuitry 236 introduces a factor into a queue selection process that results in a particular ingress queue 228 having a lower priority for selection, or being determined ineligible for selection, if dequeuing of a data unit (or portion thereof) from the particular ingress queue 228 would cause the transfer rate for the corresponding entity to exceed the controlled rate. In some other embodiments, if the particular ingress queue 228 is selected and if it is determined that the dequeuing of a data unit (or portion thereof) from the selected ingress queue 228 would cause the transfer rate corresponding to the entity to surpass its controlled rate, the rate control circuitry 236 blocks dequeuing from the ingress queue 228 and another ingress queue 228 (corresponding to a lower priority, for example) is selected, or no data units (or portions thereof) are dequeued from any of the ingress queues 228.

In an embodiment, the rate control circuitry 236 is configured to control transfer rates as discussed above only with respect to distinct subsets of the traffic that passes through the ingress portion 204-*xa*. For example, the rate control circuitry 236 is configured to successively increase transfer rates only for lossless data streams or other specified types of data units; e.g., the rate control circuitry 236 begins transferring data at the maximum transfer rate immediately in response to an no congestion message for data units that correspond to lossy streams (e.g., data units not being transmitted according to a lossless protocol), in an embodiment. In another embodiment, the rate control circuitry 236 is configured to ignore no congestion and congestion messages for data units that correspond to lossy streams (e.g., data units not being transmitted according to a lossless protocol). In still another embodiment, the congestion notification circuitry 280 is configured to not send no congestion and congestion messages for data units that correspond to lossy streams (e.g., data units not being transmitted according to a lossless protocol).

In some embodiments, the network device 200 is configurable to enable progressively increasing transfer rates as discussed above on a per-ingress queue 228 basis. For example, for ingress queues 228 that are not enabled (i.e., disabled ingress queues 228), no congestion and congestion messages corresponding to the disabled ingress queues 228 are ignored by the rate control circuitry 236, in an embodiment. In another embodiment, for disabled ingress queues 228, the rate control circuitry 236 begins transferring data at the maximum transfer rate immediately in response to an no congestion message.

Figure 7:
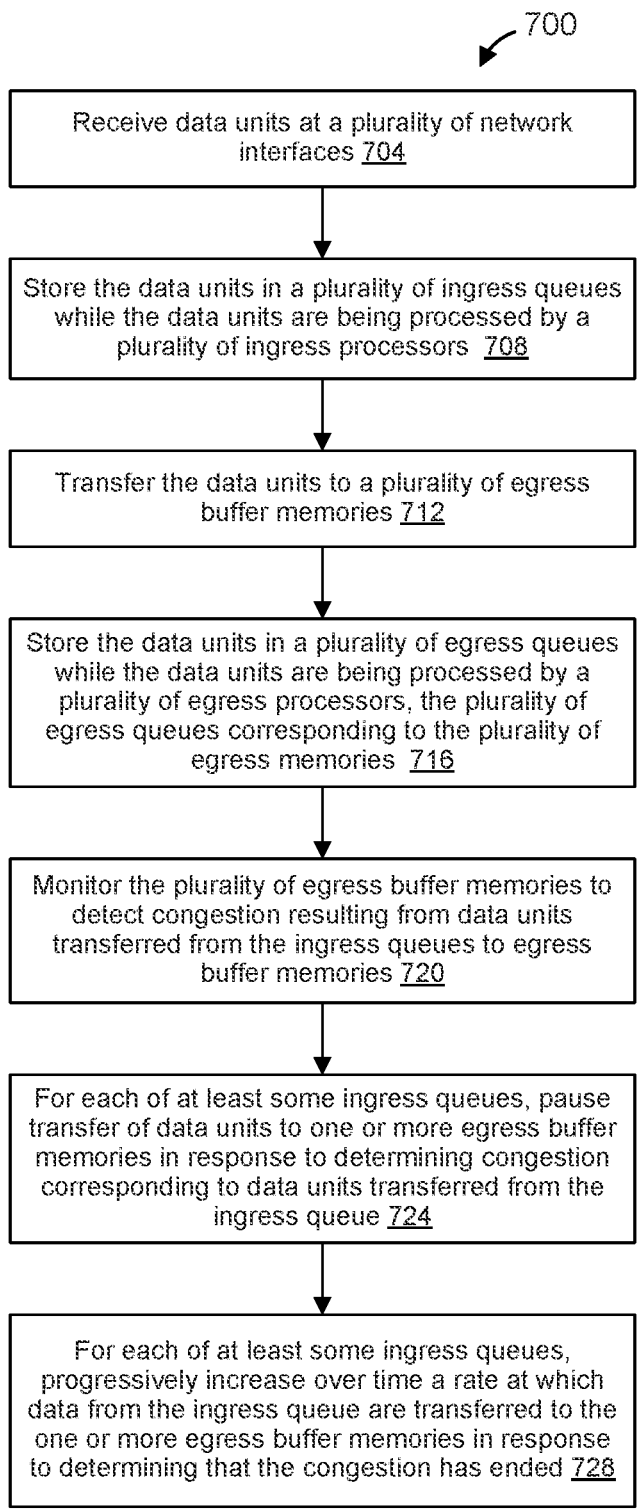
FIG. 7 is a flow diagram of an example method for processing data units in a network device, such as the network device of FIG. 2, according to an embodiment.

FIG. 7 is a flow diagram of an example method 700 for processing data units in a network device, according to an embodiment. The method 700 is implemented in a network device that includes a plurality of network interfaces; a plurality of ingress packet processors configured to process data units received via the plurality of network interfaces; a plurality of ingress buffer memories; a plurality of egress packet processors configured to process data units received from the plurality of ingress buffers; and a plurality of egress buffer memories configured to store data units, in some embodiments. In an embodiment, the method 700 is implemented by the network device 200 of FIG. 2, and FIG. 7 is described with reference to FIG. 2 for explanatory purposes. In other embodiments, the method 700 is implemented by another suitable network device.

At block 704, data units are received at the plurality of network interfaces. For example, data units are received at the ingress ports 208.

At block 708, data units received at block 704 are stored in a plurality of ingress queues corresponding to the plurality of ingress buffer memories while the data units are processed by the plurality of ingress packet processors. For example, data units are stored in the plurality of ingress queues 228 while the data units are processed by the plurality of ingress packet processors 232.

In some embodiments, the method 700 further comprises processing, by the plurality of ingress processors, data units stored in the plurality of ingress queues to determine network interfaces, among the plurality of network interfaces, that are to forward the data units.

At block 712, data units are transferred from the plurality of ingress queues to the plurality of egress buffer memories. For example, the ingress arbitration circuitry 220 transfers data units from the plurality of ingress queues 228 to the plurality of egress queues 256. In an embodiment, data units are transferred from the plurality of ingress queues to the plurality of egress queues at block 712 via an interconnect, such as one or more switching fabrics, one or more crossbars, etc. For example, the ingress arbitration circuitry 220 transfers data units from the plurality of ingress queues 228 to the plurality of egress queues 256 via the interconnect 216.

At block 716, data units transferred at block 712 are stored in a plurality of egress queues while the data units are processed by the plurality of egress processors, the plurality of egress queues corresponding to the plurality of egress buffer memories. For example, data units are stored in the plurality of egress buffer memories 252 while the data units are processed by the plurality of egress packet processors 268.

At block 720, the network device monitors the plurality of egress buffer memories to detect congestion resulting from data units transferred from the plurality of ingress queues to the plurality of egress buffer memories. For example, the congestion notification circuitry 280 monitors the plurality of egress buffer memories 252 to detect congestion corresponding to data units transferred from the plurality of ingress queues 228 to the plurality of egress buffer memories 252.

At block 724, for each of at least some ingress queues, the network device pauses transfer of data units to one or more egress buffer memories in response to determining congestion corresponding to data units transferred from the ingress queue to the one or more egress buffer memories. For example, in response to the congestion notification circuitry 280 detecting congestion corresponding to transfer of data units from an ingress queue 228 to one or more egress buffer memories 252, the rate control circuitry 236 pauses the transfer of data units from the ingress queue 228 to the one or more egress buffer memories 252.

At block 728, for each of at least some ingress queues, the network device progressively increases over time a rate at which data from the ingress queue are transferred to one or more egress buffer memories in response to determining that the congestion has ended. For example, in response to the congestion notification circuitry 280 determining that congestion corresponding to transfer of data units from an ingress queue 256 to one or more egress buffer memories 252 has ended, the rate control circuitry 236 progressively increases over time one or more respective rates at which data from the ingress queue 228 are transferred to the one or more egress buffer memories 252.

In an embodiment, progressively increasing over time the rate at which data from the ingress buffer are transferred to the one or more egress buffer memories comprises progressively increasing the rate over time from zero to a maximum transfer rate.

In an embodiment, progressively increasing over time the rate at which data from the ingress queue are transferred to the one or more egress buffer memories at block 728 comprises: increasing over time the rate in multiple steps in response to determining that the congestion corresponding to one or more egress buffer memories has ended. For example, in response to the congestion notification circuitry 280 determining that congestion corresponding to transfer of data units from an ingress queue 228 has ended, the rate control circuitry 236 progressively increases over time a rate, in multiple steps, at which data are transferred from the ingress queue 228 to one or more egress buffer memories 252.

In an embodiment, progressively increasing over time the rate at which data from the ingress queue are transferred to the one or more egress buffer memories at block 728 comprises: increasing the rate to a first value in response to determining that the congestion has ended, the first value being less than the maximum transfer rate; waiting a time period after increasing the rate to the first value; and after the time period, increasing the rate to a second value greater than the first value and less than the maximum transfer rate. For example, the rate control circuitry 236, for each of at least some ingress queues among the plurality of ingress queues: increases the rate to a first value in response to the congestion notification circuitry 280 determining that congestion has ended; waits a time period after increasing the rate to the first value; and after the time period, increases the rate to a second value greater than the first value and less than a maximum transfer rate.

In an embodiment, the method 700 further comprises: prior to setting the rate to a maximum transfer rate at block 728, again determining congestion corresponding to data units transferred from each of at least some ingress queues to one or more egress buffer memories; and for each of at least some ingress queues, in response to again determining congestion is occurring prior to setting the rate to the maximum transfer rates at block 728, pausing transfer of data units to the one or more egress buffer memories. For example, in response to the congestion notification circuitry 280 again detecting congestion prior to the rate control circuitry 236 setting the one or more respective rates to one or more respective maximum transfer rates, the rate control circuitry 236 pauses the transfer of data units from one or more ingress queues 228 to one or more egress buffer memories 252.

In some embodiments, the method 700 further comprises, for each of at least some ingress queues: in response to determining that the congestion corresponding to transferring data from the ingress queue to one or more egress buffer memories has ended, the network device waits a respective delay time period before progressively increasing over time the rate at which data from the ingress queue are transferred to the one or more egress buffer memories. For example, in response to the congestion notification circuitry 280 determining that congestion has ended, the rate control circuitry 236 waits respective delay time periods before progressively increasing over time one or more respective rates at which data from the ingress queue 228 are transferred to the one or more egress buffer memories.

In some embodiments, the method 700 further comprises determining the respective delay time periods pseudo-randomly.

In some embodiments, the method 700 further comprises: for each of at least some egress buffer memories among the plurality of egress buffer memories: the network device determines a quantity of ingress queues that are transferring data to the egress buffer memory; and for each ingress queue that is transferring data to the egress buffer memory: the network device determines, using the determined quantity of ingress queues, one or more intermediate rate values at which data is to be transferred when progressively increasing over time the rate at which data from the ingress queue are transferred to the egress buffer memory.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing data units in a network device, the method comprising:
   receiving data units at a plurality of network interfaces of the network device;
   storing data units received at the plurality of network interfaces in a plurality of ingress queues of the network device while the data units are processed by a plurality of ingress packet processors of the network device;
   transferring data units from the plurality of ingress queues to a plurality of egress buffer memories of the network device;
   storing data units transferred from the plurality of ingress queues in a plurality of egress queues while the data units are processed by a plurality of egress processors of the network device, the plurality of egress queues corresponding to the plurality of egress buffer memories;
   monitoring, by the network device, the plurality of egress buffer memories to detect congestion corresponding to data units transferred from the plurality of ingress queues;
   for each of at least some ingress queues, pausing transfer of data units to one or more egress buffer memories in response to determining congestion corresponding to data units transferred from the each ingress queue; and
   for each of at least some ingress queues, progressively increasing over time a rate at which data from the each ingress queue are transferred to one or more egress buffer memories in response to determining that the congestion has ended.

2. The method of claim 1, wherein progressively increasing over time the rate at which data from the each ingress buffer are transferred to the one or more egress buffer memories comprises progressively increasing over time the rate in multiple steps in response to determining that the congestion has ended.

3. The method of claim 2, wherein progressively increasing over time the rate in multiple steps comprises:
   increasing the rate to a first value in response to determining that the congestion has ended, the first value less than a maximum transfer rate;
   waiting a time period after increasing the rate to the first value; and
   after the time period, increasing the rate to a second value greater than the first value and less than the maximum transfer rate.

4. The method of claim 3, further comprising:
   again determining, at the network device, congestion corresponding data units transferred from the ingress queue during the time period; and
   in response to again determining congestion corresponding to data units transferred from the ingress queue during the time period, pausing transferring data from the ingress queue to the one or more egress queues.

5. The method of claim 1, wherein the first circuitry is further configured to, for each of at least some ingress queues among the plurality of ingress queues:
   in response to receiving the flow control message, wait a delay time period before starting progressively increasing over time the rate at which data from the each ingress queue are transferred to one or more egress buffer memories.

6. The method of claim 5, further comprising, for each of at least some ingress queues that are to transfer data to one or more egress buffer memories:
pseudo-randomly determining a respective delay time period.

7. The method of claim 1, further comprising, for each of at least some egress buffer memories:
determining, at the network device, a quantity of ingress queues that are transferring data to the each egress buffer memory;
for each ingress queue that is transferring data to the egress buffer memory, determine, using the quantity of ingress queues, one or more intermediate rate values at which data is to be transferred when progressively increasing over time the rate at which data from the each ingress queue are transferred to the egress buffer memory.

8. The method of claim 1, further comprising:
in response to determining congestion, sending, by first circuitry associated with one or more egress buffer memories, respective first flow control messages to second circuitry corresponding to one or more ingress queues; and
in response to determining congestion has ended, sending, by the first circuitry associated with the one or more egress buffer memories, respective second flow control messages to the second circuitry corresponding to the one or more ingress buffers;
wherein pausing transfer of data units to the one or more egress buffer memories is in response to the second circuitry corresponding to the one or more ingress buffers receiving the first flow control messages; and
wherein progressively increasing over time the rate at which data from the ingress queue are transferred to the one or more egress buffer memories is in response to the second circuitry corresponding to the one or more ingress queues receiving the second flow control message.

9. The method of claim 1, further comprising:
processing, by the plurality of ingress processors, data units stored in the plurality of ingress queues to determine network interfaces, among the plurality of network interfaces, that are to forward the data units.

10. The method of claim 1, wherein transferring data units from the plurality of ingress queues to the plurality of egress buffer memories comprises:
transferring data units from the plurality of ingress queues to the plurality of egress buffer memories via an interconnect of the network device.

11. A network device, comprising:
a plurality of network interfaces;
a plurality of ingress packet processors configured to process data units received via the plurality of network interfaces to determine network interfaces, among the plurality of network interfaces, that are to transmit the data units;
a plurality of ingress queues configured to store data units received via the plurality of network interfaces while the data units are being processed by the plurality of ingress packet processors;
a plurality of egress packet processors configured to process data units received from the plurality of ingress queues;
a plurality of egress buffer memories configured to store data units received from the plurality of ingress queues while the data units are being processed by the plurality of egress packet processors, the data units received from the plurality of ingress queues being stored in a plurality of egress queues corresponding to the plurality of egress buffer memories;
first circuitry configured to control respective rates at which data units are transferred from at least some ingress queues to at least some egress buffer memories; and
second circuitry configured to monitor the plurality of egress buffer memories for congestion and to send, to the first circuitry, flow control messages related to congestion resulting from data units transferred to egress buffer memories among the plurality of egress buffer memories from ingress queues among the plurality of ingress queues;
wherein the first circuitry is further configured to, for each of at least some ingress queues among the plurality of ingress queues, progressively increase over time a rate at which data from the each ingress queue are transferred to an egress buffer memory in response to receiving a flow control message that indicates that congestion corresponding to the egress buffer memory has ended, including progressively increasing the rate over time from zero to a maximum transfer rate.

12. The network device of claim 11, wherein the first circuitry is configured to, for each of at least some ingress queues among the plurality of ingress queues, increase over time the rate in multiple steps in response to receiving the flow control message that indicates congestion corresponding to the egress buffer memory has ended.

13. The network device of claim 11, wherein the first circuitry is configured to, for each of at least some ingress queues among the plurality of ingress queues:
increase the rate to a first value in response to receiving the flow control message that indicates congestion corresponding to the egress buffer memory has ended, the first value less than the maximum transfer rate;
wait a time period after increasing the rate to the first value; and
after the time period, increase the rate to a second value greater than the first value and less than the maximum transfer rate.

14. The network device of claim 13, wherein the first circuitry is configured to, for each of at least some ingress queues among the plurality of ingress queues:
determine whether another flow control message that indicates congestion corresponding to data transferred from the each ingress queue was received during the time period;
increase the rate to the second value in response to determining that another flow control message that indicates congestion corresponding to data transferred from the each ingress queue was not received during the time period.

15. The network device of claim 14, wherein the first circuitry is further configured to, for each of at least some ingress queues among the plurality of ingress queues:
pause transferring data from the each ingress queue to the one or more egress buffer memories in response to determining another flow control message that indicates congestion corresponding to data transferred from the each ingress queue was received during the time period.

16. The network device of claim 11, wherein the first circuitry is further configured to, for each of at least some ingress queues among the plurality of ingress queues:
in response to receiving the flow control message, wait a delay time period before starting progressively increasing over time the rate at which data from the each ingress queue are transferred to the egress buffer memory.

17. The network device of claim 16, wherein:
the first circuitry includes a pseudo-random number generator; and
the first circuitry is configured to use an output of the pseudo-random number generator to determine the delay time period.

18. The network device of claim 11, wherein the second circuitry is further configured to, for each of at least some egress buffer memories among the plurality of egress buffer memories:
in response to determining that a state corresponding to the each egress buffer memory has changed from congested to not congested, wait a delay time period before sending to the first circuitry a flow control message that indicates the state corresponding to the each egress buffer memory has changed from congested to not congested.

19. The network device of claim 11, wherein the second circuitry is further configured to, for each of at least some egress buffer memories among the plurality of egress buffer memories:
determine a quantity of ingress queues that are transferring data to the each egress buffer memory;
for each ingress queue that is transferring data to the egress buffer memory, determine, using the quantity of ingress queues, one or more intermediate rate values at which data is to be transferred when progressively increasing over time the rate at which data from the each ingress queue are transferred to the egress buffer memory; and
send the determined intermediate rate values to the first circuitry.

20. The network device of claim 11, wherein:
the second circuitry is further configured to:
for each of at least some egress buffer memories among the plurality of egress buffer memories, determine a quantity of ingress queues that are transferring data to the egress buffer memory, and
send an indication of the quantity of ingress queues to the first circuitry; and
the first circuitry is further configured to:
for each ingress queue that is transferring data to the egress buffer memory, determine, using the quantity of ingress queues, one or more intermediate rate values at which data is to be transferred when progressively increasing over time the rate at which data from the each ingress queue are transferred to the egress buffer memory.

* * * * *